United States Patent
Fukuda

(10) Patent No.: US 7,151,437 B2
(45) Date of Patent: Dec. 19, 2006

(54) RADIO COMMUNICATION SYSTEM AND METHOD, RADIO COMMUNICATION APPARATUS AND METHOD, AND PROGRAM

(75) Inventor: Kunio Fukuda, Tokyo (JP)

(73) Assignee: Sony Corporation (JP)

(*) Notice: Subject to any disclaimer, the term of this patent is extended or adjusted under 35 U.S.C. 154(b) by 277 days.

(21) Appl. No.: 10/824,300

(22) Filed: Apr. 14, 2004

(65) Prior Publication Data

US 2005/0030159 A1 Feb. 10, 2005

(30) Foreign Application Priority Data

Apr. 15, 2003 (JP) ............................ P2003-110235

(51) Int. Cl.
*H04Q 5/22* (2006.01)

(52) U.S. Cl. ............... 340/10.1; 340/10.34; 340/572.1; 310/313 R

(58) Field of Classification Search ............... 340/10.1, 340/10.2, 10.34, 572.1; 310/313 R
See application file for complete search history.

(56) References Cited

U.S. PATENT DOCUMENTS

| | | | | |
|---|---|---|---|---|
| 3,377,616 A | * | 4/1968 | Auer, Jr. ...................... | 340/989 |
| 3,981,011 A | * | 9/1976 | Bell, III ...................... | 342/44 |
| 5,130,522 A | * | 7/1992 | Yamanouchi et al. ........ | 235/492 |
| 5,245,332 A | * | 9/1993 | Katzenstein ............. | 340/10.52 |

* cited by examiner

*Primary Examiner*—Edwin C. Holloway, III
(74) *Attorney, Agent, or Firm*—Lerner,David,Littenberg,Krumholz & Mentlik, LLP

(57) ABSTRACT

A memory control unit reads pieces of bit data to be checked by a check pulse to be received next by an antenna, the pieces of bit data being stored in a memory and forming unique data. The memory control unit operates a switch based on the content of the pieces of bit data. A reflection electrode reflects a surface acoustic wave excited by an interdigital electrode when both terminals of the reflection electrode are opened by the switch. The reflection electrode passes the surface acoustic wave when both terminals of the reflection electrode are short-circuited by the switch. The present invention is applicable to RFID systems using SAW.

13 Claims, 11 Drawing Sheets

F I G. 5
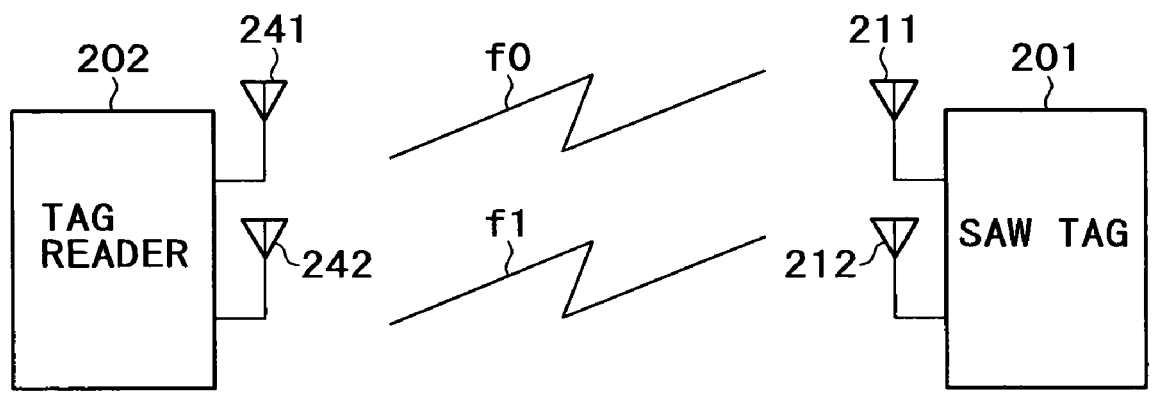

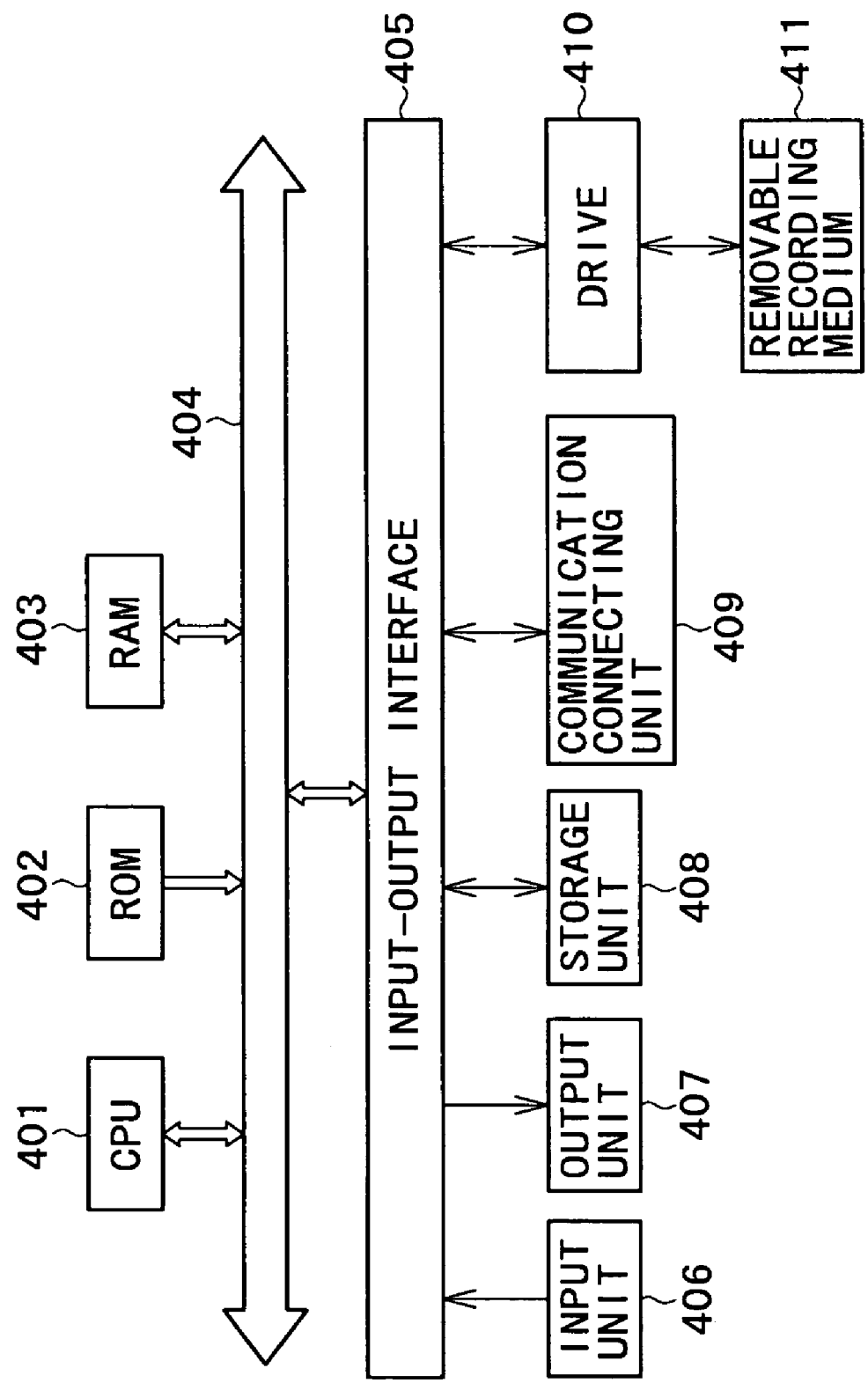

RADIO COMMUNICATION SYSTEM AND METHOD, RADIO COMMUNICATION APPARATUS AND METHOD, AND PROGRAM

CROSS-REFERENCE TO RELATED APPLICATIONS

The present application claims priority from Japanese Application No. 2003-110235, filed Apr. 15, 2003, the disclosure of which is hereby incorporated by reference herein.

BACKGROUND OF THE INVENTION

The present invention relates to a system, method, apparatus and program for radio communication, and particularly to a system, method, apparatus and program for radio communication that make it possible to miniaturize a SAW tag and enable a tag reader to detect the SAW tag reliably in an RFID (Radio Frequency Identification) system using SAW (Surface Acoustic Wave).

RFID (Radio Frequency Identification) systems have been spreading recently. An RFID system includes a tag and a reader, and allows the reader to read information stored in the tag in a non-contact manner. The RFID system may be referred to as an ID (Identification) system, a data carrier system or the like. However, this system is often referred to as an RFID system (or abbreviated to an RFID) as a common name in various countries of the world. Thus, the system will be referred to as an RFID system also in the present specification. Incidentally, the RFID system is an "identification system using high frequencies (radio waves)."

A system using SAW (Surface Acoustic Wave), for example, is known as an RFID system.

A tag in the RFID system using SAW will hereinafter be referred to as a SAW tag. The SAW tag performs completely passive operations (passive operations effected by a tag reader), and therefore has a characteristic of allowing the operating distance thereof to be increased.

FIG. 1 shows an example of the configuration of such a SAW tag. As shown in FIG. 1, the SAW tag 1 has an antenna 11, an interdigital electrode 12, and reflection electrodes 13 to 15.

The antenna 11 is formed by, for example, a half-wavelength dipole antenna or the like. The antenna 11 transmits and receives radio waves of an operational frequency (communication carrier frequency) fo. A VHF (Very High Frequency) band or a UHF (Ultra High Frequency) band is generally allocated for the communication carrier frequency fo.

The interdigital electrode 12 has an electrode pitch d1 (=λ0/2) of half a wavelength λ0 of a surface acoustic wave. The interdigital electrode 12 excites the surface acoustic wave via a piezoelectric effect by a radio wave (high-frequency electric field) received by the antenna 11. That is, the interdigital electrode 12 supplies the radio wave received by the antenna 11 as the surface acoustic wave to the reflection electrodes 13 to 15.

The reflection electrodes 13 to 15 reflect the surface acoustic wave supplied from the interdigital electrode 12. That is, it can also be said that the reflection electrodes 13 to 15 emit a reflected wave in response to the surface acoustic wave. The reflected wave emitted from one of the reflection electrodes 13 to 15 is transmitted as a radio wave from the antenna 11 via the interdigital electrode 12.

The SAW tag 1 has unique data for identifying the SAW tag 1 itself. A reflection electrode (the reflection electrodes 13 to 15 in the example of FIG. 1) indicates that a predetermined piece of bit data including the unique data is "1." Specifically, in the conventional SAW tag 1, a position representing each bit of the unique data is predetermined; when a reflection electrode is placed at a position corresponding to a predetermined bit, bit data of the bit is "1," while when no reflection electrode is placed at the position, the bit data of the bit is "0."

Thus, the unique data in FIG. 1 is 4 bits. The reflection electrode 13 is placed at a position representing the most significant bit (first bit); the reflection electrode 14 is placed at a position representing the next bit (second bit); the reflection electrode 15 is placed at a position representing the least significant bit (fourth bit in the example of FIG. 1); and no reflection electrode is placed at a position representing the third bit. Hence, the unique data is 4 bits of "1101." In other words, FIG. 1 shows an example of the configuration of the SAW tag 1 when 4-bit data of "1101" is assigned as the unique data. That is, since the unique data of the SAW tag 1 differs for each apparatus type, the number of reflection electrodes and placement positions differ for each apparatus type.

The operation of a tag reader (not shown in the figure) recognizing the SAW tag 1 will next be described with reference to FIG. 2 and FIG. 3.

FIG. 2 is a timing chart showing the timing of transmission of check pulses and the timing of reception of reflected pulses in response to the check pulses in the tag reader.

Incidentally, in this case, a transmission pulse transmitted from the tag reader to check (detect) the unique data of the SAW tag (the SAW tag 1 of FIG. 1 in this case) is referred to as a check pulse. A pulse corresponding to a reflected wave occurring when a surface acoustic wave corresponding to a check pulse is reflected from a reflection electrode (the reflection electrodes 13 to 15 in the example of FIG. 1) is referred to as a reflected pulse.

FIG. 3 is a diagram showing the relationship between a surface acoustic wave corresponding to a check pulse and reflected waves in response to the surface acoustic wave (reflected waves corresponding to reflected pulses).

Suppose that, as shown in FIG. 2, for example, the tag reader transmits a check pulse 21 at a time t0.

The check pulse 21 transmitted from the tag reader passes through the antenna 11 and the interdigital electrode 12 in FIG. 1, and then arrives at each of the reflection electrodes 13 to 15 as a surface acoustic wave 41, as shown in FIG. 3. The arrived surface acoustic wave 41 is reflected by the reflection electrodes 13 to 15, and returned to the interdigital electrode 12 as reflected waves 51 to 53, respectively. That is, the reflection electrodes 13 to 15 emit the reflected waves 51 to 53, respectively.

The reflected waves 51 to 53 are each transmitted as a radio wave via the interdigital electrode 12 and the antenna 11. The tag reader receives the radio waves, and then detects the radio waves as a reflected pulse 31, a reflected pulse 32, and a reflected pulse 34, respectively, as shown in FIG. 2.

However, as shown in FIG. 3 (FIG. 1), since the placement positions of the reflection electrodes 13 to 15 differ from each other, the arrival times of the reflected waves 51 to 53 at the tag reader differ from each other.

Specifically, as shown in FIG. 2, the tag reader detects the reflected pulse 31 corresponding to the reflected wave 51 emitted by the reflection electrode 13 at a time t1 after the passage of a time T1 from a time to at which the check pulse 21 is transmitted. Thereby, the tag reader determines that the bit data of the first bit (most significant bit) in the unique data of the SAW tag 1 to which the check pulse 21 is transmitted is "1."

Similarly, the tag reader detects the reflected pulse 32 corresponding to the reflected wave 52 emitted by the reflection electrode 14 at a time t2 after the passage of a time T2 from the time t0 at which the check pulse 21 is transmitted. Thereby, the tag reader determines that the bit data of the second bit in the unique data of the SAW tag 1 to which the check pulse 21 is transmitted is "1."

On the other hand, a reflected pulse 33 does not arrive at the tag reader even at a time t3 at which the reflected pulse 33 next to the reflected pulse 32 is to arrive (the SAW tag 1 in FIG. 1 has no reflection electrode disposed to emit a reflected wave corresponding to the reflected pulse 33). Thereby, the tag reader determines that the bit data of the third bit in the unique data of the SAW tag 1 to which the check pulse 21 is transmitted is "0."

Then, the tag reader detects the reflected pulse 34 corresponding to the reflected wave 53 emitted by the reflection electrode 15 at a time t4 after the passage of a time T3 from the time to at which the check pulse 21 is transmitted. Thereby, the tag reader determines that the bit data of the fourth bit (least significant bit) in the unique data of the SAW tag 1 to which the check pulse 21 is transmitted is "1."

Thus, the tag reader can detect that the unique data of the SAW tag 1 to which the check pulse 21 is transmitted is "1101" and thereby recognizes the SAW tag 1.

A SAW tag 61 as shown in FIG. 4 is disclosed in L. Reindl and W. Ruile, Programmable Reflectors for SAW-ID-Tags, Siemens AG, Corporate Research and Development, Munich, Germany, 1993, Ultrasonic Symposium, pp. 125–130. As shown in FIG. 4, the SAW tag 61 has an antenna 11 and an interdigital electrode 12 having basically the same configuration and function as the SAW tag 1 of FIG. 1. However, the SAW tag 61 of FIG. 4 has reflection electrodes 71 to 74, which are interdigital electrodes having an electrode pitch d2 (=$\lambda 0/4$) of ¼ of a wavelength $\lambda 0$ of a surface acoustic wave, in place of the reflection electrodes 13 to 15 of the SAW tag 1 of FIG. 1.

Each of the reflection electrodes 71 to 74 functions as a reflector to reflect a surface acoustic wave when both terminals thereof are open. On the other hand, each of the reflection electrodes 71 to 74 does not function as a reflector and passes a surface acoustic wave when both terminals thereof are short-circuited. Thus, by changing a state of connection of both terminals of each of the reflection electrodes 71 to 74, it is possible to control the reflection and passage of a surface acoustic wave.

In FIG. 4, for correspondence with FIG. 1, each of the reflection electrode 71, the reflection electrode 72, and the reflection electrode 74 has both terminals thereof open to function as a reflector. That is, each of the reflection electrode 71, the reflection electrode 72, and the reflection electrode 74 reflects a surface acoustic wave supplied from the interdigital electrode 12, as with the reflection electrodes 13 to 15 in FIG. 1. In other words, each of the reflection electrode 71, the reflection electrode 72, and the reflection electrode 74 emits a reflected wave in response to the surface acoustic wave, and supplies the reflected wave to the interdigital electrode 12.

Since both terminals of the reflection electrode 73 are short-circuited, the reflection electrode 73 passes the surface acoustic wave supplied from the interdigital electrode 12. That is, the reflection electrode 73 does not emit a reflected wave in response to the surface acoustic wave (does not supply a reflected wave to the interdigital electrode 12).

Thus, the SAW tag 61 having the configuration of FIG. 4 operates in exactly the same manner as the SAW tag 1 having the configuration of FIG. 1. By performing basically the same processes as the series of processes described above, the tag reader can detect that the unique data of the SAW tag 61 having the configuration of FIG. 4 is also "1101," and recognizes the SAW tag 61.

However, a reflection electrode in conventional SAW tags having the configurations of FIG. 1 and FIG. 4 functions to represent one predetermined piece of bit data included in the unique data. Therefore, as the number of bits of the unique data is increased, the number of reflection electrodes needs to be correspondingly increased by the same number. As a result, as the number of bits of the unique data is increased, the physical size of the SAW tag becomes larger.

In the example of FIG. 2, although the amplitude of the reflected pulses is shown as being the same as the amplitude of the check pulse (transmission pulse from the tag reader) for simplicity of description, in practice, the more distant the position of the reflection electrodes is from the interdigital electrode (interdigital electrode 12 in FIG. 1 and FIG. 4), the more the amplitude of the reflected pulses will be attenuated. That is, the amplitude of the reflected pulse corresponding to the surface acoustic wave reflected (that is, the reflected wave emitted) by the reflection electrode disposed at the position corresponding to the least significant bit of the unique data (for example, the reflection electrode 15 in the example of FIG. 1 and the reflection electrode 74 in the example of FIG. 4) will be attenuated greatly. As a result, the larger the number of bits in the unique data of the SAW tag (that is, the more distant the reflection electrode is from the interdigital electrode), the more difficult it is for the tag reader to recognize the SAW tag (to detect bit data of the least significant bit of the unique data).

SUMMARY OF THE INVENTION

The present invention has been made in view of the above, and it is accordingly an object of the present invention to make it possible to miniaturize a SAW tag and enable a tag reader to detect the SAW tag reliably in an RFID system using SAW.

According to a first aspect of the present invention, there is provided a radio communication system, including a first radio communication apparatus; and a second radio communication apparatus having unique data for identifying the second radio communication apparatus, the unique data including pieces of bit data.

The first radio communication apparatus includes transmitting means for sequentially transmitting a plurality of check pulses to the second radio communication apparatus at predetermined time intervals, each check pulse being operable to check a corresponding piece of the bit data; and detecting means for detecting the unique data by determining each piece of the bit data based on whether there is a response from the second radio communication apparatus to each of the check pulses transmitted by the transmitting means.

The second radio communication apparatus includes exciting means for exciting a surface acoustic wave corresponding to each of the check pulses transmitted by the first radio communication apparatus; setting means for setting whether to respond to a check pulse to be transmitted by the first radio communication apparatus based on a content of the piece of bit data to be checked by the check pulse to be transmitted; and responding means for responding to a transmitted check pulse, the responding means reflecting a surface acoustic wave corresponding to the transmitted check pulse when the setting means has made a setting to respond to the transmitted check pulse, and the responding means passing the surface acoustic wave corresponding to the transmitted check pulse when the setting means has made a setting prohibiting a response to the transmitted check pulse.

According to a second aspect of the present invention, there is provided a method of radio communication between a first radio communication apparatus and a second radio communication apparatus having unique data for identifying the second radio communication apparatus, the unique data including pieces of bit data, the radio communication method including sequentially transmitting a plurality of check pulses from the first radio communication apparatus to the second radio communication apparatus at predetermined time intervals, each check pulse being operable to check a corresponding piece of the bit data; setting in the second radio communication apparatus whether to respond to a check pulse to be transmitted by the first radio communication apparatus based on a content of the piece of bit data to be checked by the check pulse to be transmitted; exciting a surface acoustic wave at the second radio communication apparatus in response to each check pulse transmitted by the first radio communication apparatus; reflecting the excited surface acoustic wave corresponding to a transmitted check pulse when a setting to respond to the transmitted check pulse has been set in the second radio communication apparatus, and passing the excited surface acoustic wave corresponding to the transmitted check pulse when a setting prohibiting a response to the transmitted check pulse has been set in the second radio communication apparatus; and detecting the unique data by determining each piece of the bit data in the second radio communication apparatus based on whether there is a response from the second radio communication apparatus to each of the check pulses transmitted from the first radio communication apparatus.

According to a third aspect of the present invention, there is provided a first radio communication apparatus for radio communication with a second radio communication apparatus having unique data for identifying the second radio communication apparatus, the unique data including pieces of bit data, the first radio communication apparatus including transmitting means for sequentially transmitting a plurality of check pulses to the second radio communication apparatus at predetermined time intervals, each check pulse being operable to excite a surface acoustic wave at the second radio communication apparatus and to check a corresponding piece of the bit data; receiving means for receiving reflected waves emitted from the second radio communication apparatus in response to the surface acoustic waves excited by the check pulses transmitted by the transmitting means; and detecting means for detecting the unique data by determining each piece of the bit data in the second radio communication apparatus based on whether the receiving means receives a reflected wave in response to each surface acoustic wave excited by the check pulses transmitted by the transmitting means.

According to a fourth aspect of the present invention, there is provided a method of radio communication with a radio communication apparatus having unique data for identifying the radio communication apparatus, the unique data including pieces of bit data, the radio communication method including sequentially transmitting a plurality of check pulses to the radio communication apparatus at predetermined time intervals, each check pulse being operable to excite a surface acoustic wave at the radio communication apparatus and to check a corresponding piece of the bit data; receiving reflected waves emitted from the radio communication apparatus in response to the surface acoustic waves excited by the check pulses transmitted in the transmitting step; and detecting the unique data by determining each piece of the bit data based on whether a reflected wave is received in the receiving step in response to each surface acoustic wave excited by the check pulses transmitted in the transmitting step.

According to a fifth aspect of the present invention, there is provided a recording medium recorded with a program for carrying out a method of radio communication with a radio communication apparatus having unique data for identifying the radio communication apparatus, the unique data including pieces of bit data, the method including generating a plurality of check pulses for sequential transmission to the radio communication apparatus at predetermined time intervals, each check pulse being operable to excite a surface acoustic wave at the radio communication apparatus and to check a corresponding piece of the bit data; and detecting the unique data by determining each piece of the bit data based on whether a reflected wave is received from the radio communication apparatus in response to each surface acoustic wave excited by the check pulses.

According to a sixth aspect of the present invention, there is provided a first radio communication apparatus for radio communication with a second radio communication apparatus, the first radio communication apparatus having unique data for identifying the first radio communication apparatus, the unique data including pieces of bit data, the first radio communication apparatus including exciting means for exciting a surface acoustic wave corresponding to each of a plurality of check pulses transmitted from the second radio communication apparatus at predetermined time intervals, each check pulse being operable to check a corresponding piece of the bit data; setting means for setting whether to respond to a check pulse to be transmitted by the second radio communication apparatus based on a content of the piece of bit data to be checked by the check pulse to be transmitted; and responding means for responding to a transmitted check pulse, the responding means reflecting a surface acoustic wave corresponding to the transmitted check pulse when the setting means has made a setting to respond to the transmitted check pulse, and the responding means passing the surface acoustic wave corresponding to the transmitted check pulse when the setting means has made a setting prohibiting a response to the transmitted check pulse.

According to a seventh aspect of the present invention, there is provided a method of radio communication with a radio communication apparatus in which the radio communication apparatus detects predetermined unique data, the unique data including pieces of bit data, the radio communication method including exciting a surface acoustic wave corresponding to each of a plurality of check pulses transmitted from the radio communication apparatus at predetermined time intervals, each check pulse being operable to check a corresponding piece of the bit data; setting whether to respond to a check pulse to be transmitted by the radio communication apparatus based on a content of the piece of bit data to be checked by the check pulse to be transmitted; and responding to a transmitted check pulse by reflecting a surface acoustic wave corresponding to the transmitted check pulse when a setting to respond to the transmitted check pulse has been set in the setting step, and by passing the surface acoustic wave corresponding to the transmitted check pulse when a setting prohibiting a response to the transmitted check pulse has been set in the setting step.

According to an eighth aspect of the present invention, there is provided a recording medium recorded with a program for carrying out a method of radio communication between a first radio communication apparatus and a second radio communication apparatus, the second radio communication apparatus having unique data for identifying the second radio communication apparatus, the unique data including pieces of bit data, the second radio communication apparatus including an electrode for exciting a surface acoustic wave corresponding to each of a plurality of check pulses transmitted from the first radio communication apparatus at predetermined time intervals, each check pulse being operable to check a corresponding piece of the bit data, a reflection electrode having a pair of terminals, the reflection electrode reflecting the surface acoustic wave excited by the electrode when the pair of terminals is open, and passing the surface acoustic wave excited by the electrode when the pair of terminals is short-circuited, and a switch connected to the pair of terminals, the method including determining whether a response is to be made to a check pulse to be transmitted by the first radio communication apparatus based on a content of the piece of bit data to be checked by the check pulse to be transmitted, setting the switch to open the pair of terminals when it is determined that a response is to be made to the check pulse to be transmitted, and setting the switch to short-circuit the pair of terminals when it is determined that a response to the check pulse to be transmitted is to be prohibited.

The radio communication apparatuses including the radio communication system according to the present invention may be able to perform, for example, not only radio communication with another communication apparatus, but also wire communication or communication in which radio communication and wire communication are mixed. That is, they may be able to perform both wire communication and radio communication with another communication apparatus, or wire communication with a first communication apparatus and radio communication with a second communication apparatus different from the first communication apparatus. In other words, the radio communication system according to the present invention may perform radio communication in one section and wire communication in another section.

The first radio communication apparatus according to the present invention may be able to perform, for example, not only radio communication with another communication apparatus, but also wire communication or communication in which radio communication and wire communication are mixed. That is, the first radio communication apparatus may be able to perform both wire communication and radio communication with a second communication apparatus, or wire communication with a second communication apparatus and radio communication with a third communication apparatus different from the second communication apparatus. In other words, the first radio communication apparatus according to the present invention may perform radio communication in one section and wire communication in another section.

The second radio communication apparatus according to the present invention may be able to perform, for example, not only radio communication with another communication apparatus, but also wire communication or communication in which radio communication and wire communication are mixed. That is, the second radio communication apparatus may be able to perform both wire communication and radio communication with a second communication apparatus, or wire communication with a second communication apparatus and radio communication with a third communication apparatus different from the second communication apparatus. In other words, the second radio communication apparatus according to the present invention may perform radio communication in one section and wire communication in another section.

According to the present invention, it is possible to miniaturize a SAW tag and enable a tag reader to detect the SAW tag reliably in an RFID system using SAW.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 5 is a block diagram showing an example of the configuration of an RFID system as a radio communication system to which an embodiment of the present invention is applied;

FIG. 13 is a block diagram showing another example of the configuration of the tag reader or the SAW tag in the RFID system of FIG. 5.

DETAILED DESCRIPTION

A preferred embodiment of the present invention will hereinafter be described. The correspondence between required elements set forth in the claims and concrete examples in the embodiment of the invention are illustrated as follows. This description is to confirm that the concrete examples supporting inventions set forth in the claims are described in the embodiment of the invention. Therefore, even when there is a concrete example described in the embodiment of the invention but not described herein as corresponding to a required element, it does not signify that the concrete example does not correspond to the required element. Conversely, even when a concrete example is described herein as corresponding to a required element, it does not signify that the concrete example does not correspond to a required element other than the required element.

Further, this description does not signify that all the inventions corresponding to the concrete examples described in the embodiment of the invention are set forth in the claims. In other words, this description does not negate the presence of inventions corresponding to concrete examples described in the embodiment of the invention but not set forth in the claims of the present application, that is, the presence of inventions to be claimed in a divisional application or to be added by amendments in the future.

Figure 6:
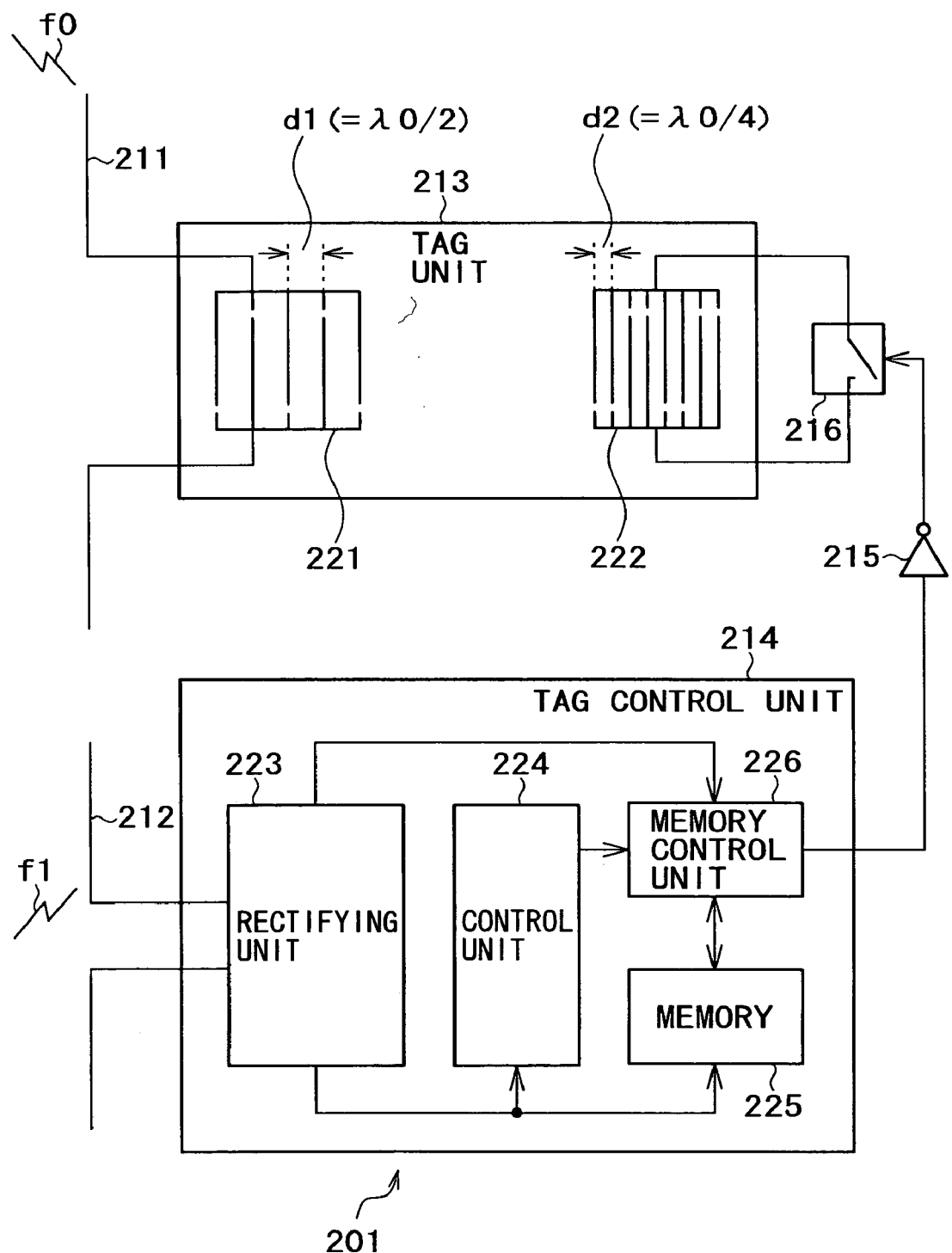
FIG. 6 is a block diagram showing in detail an example of the configuration of a tag reader in the RFID system of FIG. 5.
Figure 7:
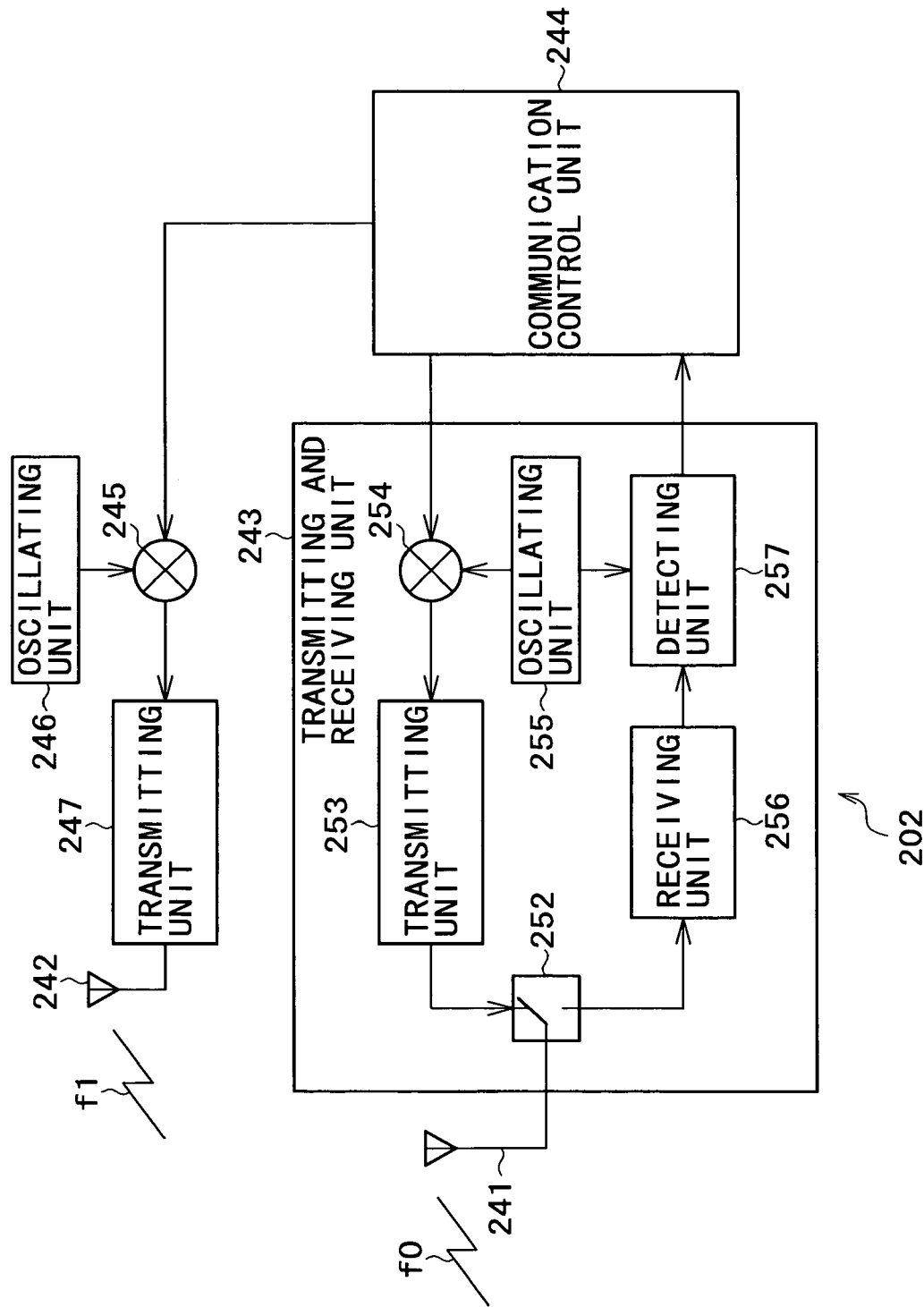
FIG. 7 is a block diagram showing in detail an example of the configuration of a SAW tag in the RFID system of FIG. 5.
Figure 12:
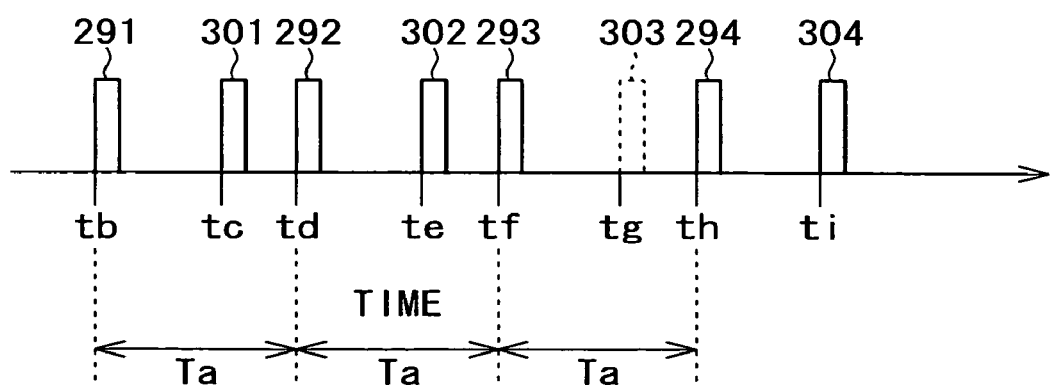
FIG. 12 is another diagram of assistance in explaining the operation of the RFID system of FIG. 5.

In a radio communication system (for example, the system of FIG. 5) for radio communication by a first radio communication apparatus (for example, a tag reader 202 in FIG. 5) and a second radio communication apparatus (for example, a SAW tag 201 in FIG. 5) having unique data for identifying the second radio communication apparatus itself, the first radio communication apparatus (for example, the tag reader 202 having the configuration of FIG. 7) includes: transmitting means (for example, a transmitting part (a transmitting unit 253 and the like) of a transmitting and receiving unit 243 and an antenna 241 in FIG. 7) for sequentially transmitting each of a plurality of check pulses (for example, check pulses 291 to 294 in FIG. 12) to the second radio communication apparatus at a predetermined time period (for example, a time Ta in FIG. 12), the check pulses being for checking each piece of bit data including the unique data; and detecting means (for example, the communication control unit 244 in FIG. 7) for detecting the unique data by determining each piece of the corresponding bit data on the basis of whether there is a response (for example, reflected pulses 301 to 304 in FIG. 12 (reflected waves corresponding to the reflected pulses)) from the second radio communication apparatus to each of the plurality of check pulses transmitted by the transmitting means. The second radio communication apparatus (for example, the SAW tag 201 having the configuration of FIG. 6) includes: exciting means (for example, the interdigital electrode 221 in FIG. 6) for exciting a surface acoustic wave from the check pulse transmitted from the first radio communication apparatus; setting means (for example, the tag control unit 214, particularly the memory control unit 226, and the inverter 215 in FIG. 6) for setting whether to respond to the next check pulse to be transmitted by the first radio communication apparatus on the basis of the content of the bit data to be checked by the check pulse in the unique data; and responding means (for example, a reflection electrode 222 and a switch 216 connected to both terminals of the reflection electrode 222 in FIG. 6) for, when the exciting means excites the surface acoustic wave from a first check pulse (for example, the check pulse 291 in FIG. 12) to which the setting means makes a setting to respond, responding to the first check pulse by reflecting the surface acoustic wave (by emitting a reflected wave corresponding to the reflected pulse 301 in FIG. 12), and when the exciting means excites the surface acoustic wave from a second check pulse (for example, the check pulse 293 in FIG. 12) to which the setting means prohibits a response, prohibiting a response to the second check pulse by passing the surface acoustic wave (by not emitting a reflected wave corresponding to the reflected pulse 303 in FIG. 12).

A radio communication apparatus (for example, the tag reader 202 in FIG. 7) for radio communication with another radio communication apparatus (for example, the SAW tag 201 in FIG. 5 and FIG. 6) having unique data for identifying the other radio communication apparatus itself includes: transmitting means (for example, a transmitting part (a transmitting unit 253 and the like) of a transmitting and receiving unit 243 and an antenna 241 in FIG. 7) for sequentially transmitting each of a plurality of check pulses (for example, check pulses 291 to 294 in FIG. 12) to the other radio communication apparatus at a predetermined time period (for example, the interval of time Ta in FIG. 12), the check pulses being for checking each piece of bit data including the unique data; receiving means (for example, the antenna 241 and a receiving part (a receiving unit 256 and the like) of the transmitting and receiving unit 243 in FIG. 7) for receiving a reflected wave emitted from the other radio communication apparatus (for example, the SAW tag 201 having the configuration of FIG. 6) that excites a surface acoustic wave from the check pulse transmitted from the transmitting means and controls whether to emit the reflected wave in response to the surface acoustic wave on the basis of the content of the bit data in the unique data to be checked by the check pulse; and detecting means (for example, the communication control unit 244 in FIG. 7 for detecting reflected pulses 301 to 304 in FIG. 12) for detecting the unique data by determining each piece of the corresponding bit data on the basis of whether the receiving means receives a reflected wave in response to each of the plurality of check pulses transmitted from the transmitting means.

Figure 11:
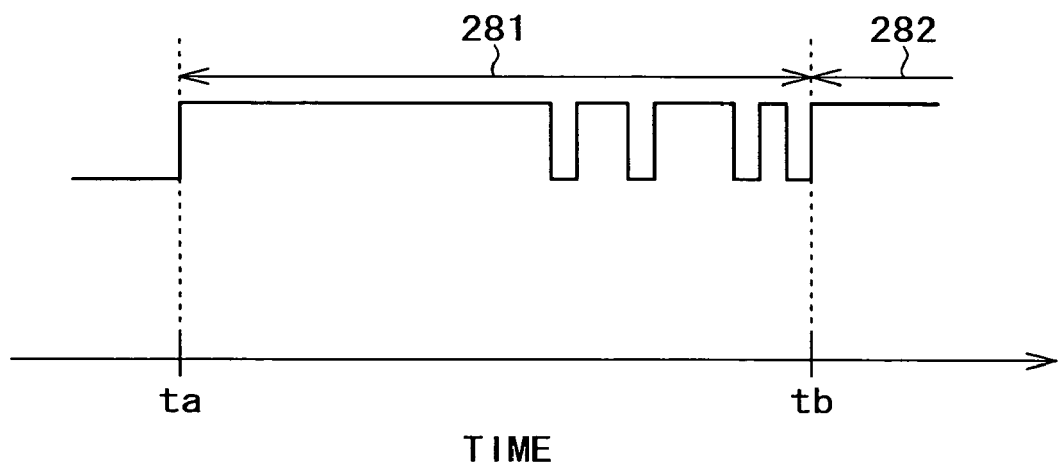
FIG. 11 is a diagram of assistance in explaining the operation of the RFID system of FIG. 5.

The radio communication apparatus further includes power supply means (for example, a multiplying unit 245, an oscillating unit 246, a transmitting unit 247, and an antenna 242 in FIG. 7 for supplying power, such as, for example, power supply signal 282 in FIG. 11) for supplying the power used when the other radio communication apparatus controls the emission of the reflected wave.

A radio communication apparatus (for example, the SAW tag 201 in FIG. 6) for radio communication with another radio communication apparatus (for example, the tag reader 202 in FIG. 5 and FIG. 7) includes: exciting means (for example, the interdigital electrode 221 in FIG. 6) for exciting a surface acoustic wave from a check pulse when each of a plurality of check pulses (for example, check pulses 291 to 294 in FIG. 12) is transmitted from the other radio communication apparatus at a predetermined time period (for example, the interval of time Ta in FIG. 12), the check pulses being for checking each piece of bit data including unique data for identifying the radio communication apparatus itself; setting means (for example, the memory control unit 226 and the inverter 215 in FIG. 6) for setting whether to respond to the next check pulse to be transmitted by the other radio communication apparatus on the basis of the content of the bit data in the unique data to be checked by the check pulse; and responding means (for example, a reflection electrode 222 and a switch 216 connected to both terminals of the reflection electrode 222 in FIG. 6) for, when the exciting means excites the surface acoustic wave from a first check pulse (for example, the check pulse 291 in FIG. 12) to which the setting means makes a setting to respond, responding to the first check pulse by reflecting the surface acoustic wave (by emitting the reflected pulse 301 in FIG. 12, for example), and when the exciting means excites the surface acoustic wave from a second check pulse (for example, the check pulse 293 in FIG. 12) to which the setting means prohibits a response, prohibiting a response to the second check pulse by passing the surface acoustic wave (by not emitting the reflected pulse 303 in FIG. 12, for example).

In the radio communication apparatus, the responding means includes: one reflection electrode (for example, the reflection electrode 222 in FIG. 6) for reflecting the surface acoustic wave excited by the exciting means when both terminals of the reflection electrode are open, and for passing the surface acoustic wave when both terminals of the reflection electrode are short-circuited; and a switch (for example, the switch 216 in FIG. 6) connected to both terminals of the reflection electrode; wherein the setting means operates the switch (for example, sets the switch 216 in FIG. 6 to an off state) to open both terminals of the reflection electrode when the setting means makes a setting to respond to the check pulse, and the setting means operates the switch (for example, sets the switch 216 in FIG. 6 to an on state) to short-circuit both terminals of the reflection electrode when the setting means makes a setting to prohibit response to the check pulse.

The radio communication apparatus further includes: storing means (for example, the memory 225 in FIG. 6) for storing the unique data in advance; and power providing means (for example, the rectifying unit 223 in FIG. 6) for providing power (for example, power supplied as power supply signal 282 in FIG. 11) supplied from the other radio communication apparatus as power involved in processing in which the setting means reads bit data to be checked by the next check pulse from the unique data stored in the storing means and sets whether to respond to the check pulse on the basis of the read bit data.

FIG. 5 shows an example of a configuration of an RFID system as a radio communication system to which the present embodiment is applied. As shown in FIG. 5, the RFID system to which the present embodiment is applied includes a SAW tag 201 and a tag reader 202.

Incidentally, while only one SAW tag 201 and one tag reader 202 are shown in the RFID system of FIG. 5 for simplicity of description, the RFID system to which the present embodiment is applied can, of course, include a plurality of SAW tags including the SAW tag 201 and a plurality of tag readers including the tag reader 202, though not shown in the figure.

The SAW tag 201 has an antenna 211 for radio communication with the tag reader 202 at the above-mentioned operational frequency f0 and an antenna 212 for radio communication with the tag reader 202 at a predetermined frequency f1. Therefore the tag reader 202 also has an antenna 241 for radio communication with the SAW tag 201 at the operational frequency f0 and an antenna 242 for radio communication with the SAW tag 201 at the predetermined frequency f1. The difference between radio communications performed at the operational frequency f0 and radio communications performed at the predetermined frequency f1 will be described later.

FIG. 6 is a block diagram showing details of a configuration example of the SAW tag 201.

As shown in FIG. 6, the SAW tag 201 has the antenna 211 and the antenna 212 described above as well as a tag unit 213, a tag control unit 214, an inverter 215, and a switch 216.

The antenna 211 and the antenna 212 are not specifically limited in form as long as each can be used at its corresponding frequency (the operational frequency f0 for the antenna 211 and the frequency f1 for the antenna 212); for example, a dipole antenna or the like having a length of half a wavelength of the corresponding frequency can be applied.

The tag unit 213 includes an interdigital electrode 221 having an electrode pitch d1 of half a wavelength $\lambda 0$ of a surface acoustic wave, and a reflection electrode 222 as an interdigital electrode having an electrode pitch d2 of ¼ of the wavelength $\lambda 0$ of the surface acoustic wave.

The interdigital electrode 221 excites a surface acoustic wave (SAW) via a piezoelectric effect by a radio wave (high-frequency electric field) received by the antenna 211. That is, the interdigital electrode 221 supplies the radio wave received by the antenna 211 as a surface acoustic wave to the reflection electrode 222. Therefore, the above-described conventional interdigital electrode (the interdigital electrode 12 in FIG. 1 or FIG. 4), for example, can be applied as the interdigital electrode 221.

When both terminals of the reflection electrode 222 are open, the reflection electrode 222 functions as a reflector to reflect the surface acoustic wave supplied from the interdigital electrode 221 (emit a reflected wave). On the other hand, when both terminals of the reflection electrode 222 are short-circuited, the reflection electrode 222 does not function as a reflector, and passes the surface acoustic wave. Therefore, one of the above-described reflection electrodes 71 to 74 in FIG. 4, for example, can be applied as the reflection electrode 222.

The analog switch 216 is connected to both terminals of the reflection electrode 222. The state (an on state or an off state) of the analog switch 216 is controlled by the tag control unit 214.

In other words, the tag control unit 214 controls the reflection and passage of the surface acoustic wave at the reflection electrode 222 by changing the state of the analog switch 216, that is, by changing the state of connection (open or short) of both terminals of the reflection electrode 222.

The tag control unit 214 includes: a rectifying unit 223 for rectifying an external radio wave, that is, a radio wave received by the antenna 212; a control unit 224 for determining an external command and controlling the operation of the whole of the tag control unit 214; a memory 225 for storing the unique data of the SAW tag 201 and the like; and a memory control unit 226 for effecting control to read information (for example, the unique data of the SAW tag 201) stored in the memory 225.

When a tag read command (for example, a command 281 in FIG. 11 to be described later) is transmitted as a radio wave of the frequency f1 from the tag reader 202 as later described, and then received by the antenna 212, the rectifying unit 223 rectifies the radio wave to generate and store internal energy. Using this energy, the control unit 224 recognizes the tag read command, and issues a tag read (that is, reading of the unique data of the SAW tag 201) instruction to the memory control unit 226.

In response to this instruction, the memory control unit 226 serially reads the unique data of the SAW tag 201 from the memory 225, that is, reads pieces of bit data including the unique data in order from the most significant bit one by one, for example. The memory control unit 226 sequentially supplies the pieces of bit data to the inverter 215. Specifically, for example, when the read bit data is "1," the memory control unit 226 supplies a high-level signal to the inverter 215, and when the read bit data is "0," the memory control unit 226 supplies a low-level signal to the inverter 215.

Incidentally, as later described, energy required for this memory reading processing (processing for reading the unique data of the SAW tag 201 from the memory 225) is supplied from the tag reader 202 via the antenna 212 and the rectifying unit 223.

The inverter 215 inverts the signal supplied thereto (the signal corresponding to each piece of the bit data including the unique data of the SAW tag 201), and then supplies the inverted signal to the switch 216 as a control signal for changing the state (an on state or an off state) of the analog switch 216.

The switch 216 sets the state thereof to an on state when a high-level signal corresponding to "1" is supplied from the inverter 215 (that is, when the bit data read from the memory 225 is "0"), for example. Thereby, both terminals of the reflection electrode 222 are short-circuited to pass the surface acoustic wave supplied from the interdigital electrode 221. That is, the reflection electrode 222 does not emit a reflected wave.

On the other hand, the switch 216 sets the state thereof to an off state when a low-level signal corresponding to "0" is supplied from the inverter 215 (that is, when the bit data read from the memory 225 is "1"), for example. Thereby, both terminals of the reflection electrode 222 are opened to reflect the surface acoustic wave supplied from the interdigital electrode 221. That is, the reflection electrode 222 emits a reflected wave. The reflected wave is transmitted as a radio wave of the operational frequency f0 from the antenna 211 via the interdigital electrode 221.

Incidentally, control of the changing of the switch 216 is effected in synchronization with transmission cycles of check pulses transmitted from the tag reader 202 (for example, at intervals of time Ta in FIG. 12 to be described later).

In other words, when each of a plurality of check pulses (for example, check pulses 291 to 294 in FIG. 12 to be described later) for checking each piece of the bit data including the unique data is transmitted from the tag reader 202 (FIG. 5) at predetermined time intervals (for example, the time intervals Ta in FIG. 12 to be described later) as later described, the interdigital electrode 221 in the SAW tag 201 according to the present embodiment excites a surface acoustic wave from the check pulse, and then supplies the surface acoustic wave to the reflection electrode 222.

At this time, the memory control unit 226 and the inverter 215 read bit data in the unique data to be checked by the check pulse to be transmitted next by the tag reader 202 from the memory 225, and set whether to respond to the check pulse on the basis of the content of the bit data. Specifically, when making a setting to respond to the check pulse, the memory control unit 226 and the inverter 215 supply the switch 216 with a control signal for setting the switch 216 to an off state (opening both terminals of the reflection electrode 222), while when making a setting to prohibit a response to the check pulse, the memory control unit 226 and the inverter 215 supply the switch 216 with a control signal for setting the switch 216 to an on state (short-circuiting both terminals of the reflection electrode 222).

When the interdigital electrode 221 excites the surface acoustic wave from a first check pulse (for example, the check pulse 291 in FIG. 12 to be described later) to which a setting is made to respond, the reflection electrode 222 and the switch 216 connected to both terminals of the reflection electrode 222 respond to the first check pulse by reflecting the surface acoustic wave (for example, by emitting a reflected wave corresponding to the reflected pulse 301 in FIG. 12 to be described later). On the other hand, when the interdigital electrode 221 excites the surface acoustic wave from a second check pulse (for example, the check pulse 293 in FIG. 12 to be described later) to which a setting is made to prohibit response, the reflection electrode 222 and the switch 216 prohibit a response to the second check pulse by passing the surface acoustic wave (for example, by not emitting a reflected wave corresponding to the reflected pulse 303 in FIG. 12 to be described later).

Thus, the SAW tag 201 requires only one reflection electrode 222 to represent the unique data, so that the SAW tag 201 can be miniaturized. Also, the reflection electrode 222 can be disposed as close to the interdigital electrode 221 as possible, so that a reflected pulse can be emitted which is not attenuated with respect to the amplitude of the check pulse transmitted from the tag reader 202. Therefore, the SAW tag 201 to which the present embodiment is applied can solve the above-described conventional problems.

FIG. 7 is a block diagram showing details of a configuration example of the tag reader 202.

The tag reader 202 has the above-described antenna 241 and a transmitting and receiving unit 243 for transmitting and receiving information (performing radio communication) at the operational frequency f0 via the antenna 241.

The transmitting and receiving unit 243 includes a switch 252, a transmitting unit 253, a multiplying unit 254, an oscillating unit 255, a receiving unit 256, and a detecting unit 257.

In transmission processing, for example, the transmitting and receiving unit 243 changes contacts of the switch 252 so as to connect the antenna 241 and the transmitting unit 253 with each other.

The multiplying unit 254, for example, modulates a baseband signal supplied from a communication control unit 244 (a signal corresponding to a check pulse in this case) into a modulated signal in a high-frequency band using a signal of the frequency f0 (that is, the operational frequency f0) oscillated by the oscillating unit 255, and then supplies the modulated signal to the transmitting unit 253.

The transmitting unit 253, for example, subjects the modulated signal supplied thereto to predetermined processing (for example, transmission power control, amplification, or other processing), and then supplies the result as a transmitting signal to the antenna 241 via the switch 252. The antenna 241 transmits the transmitting signal as a radio wave to the outside (the SAW tag 201 in FIG. 6 in this case).

In reception processing, for example, the transmitting and receiving unit 243 changes the contacts of the switch 252 so as to connect the antenna 241 and the receiving unit 256 with each other. The receiving unit 256 receives a signal of the operational frequency f0 (a signal corresponding to a reflected pulse in this case) transmitted from the outside (the SAW tag 201 in FIG. 6 in this case) via the antenna 241 and the switch 252, for example, subjects the signal to predetermined processing (for example, amplification or other processing), and then supplies the result as a received signal to the detecting unit 257.

The detecting unit 257 subjects the supplied received signal in the high-frequency band to demodulation and detection using a signal of the frequency f0 (that is, the operational frequency f0) oscillated by the oscillating unit 255, thereby converting the received signal into a baseband signal, and then supplies the baseband signal to the communication control unit 244.

The communication control unit 244 generates a check pulse (transmission pulse), converts the check pulse into a baseband signal, and then supplies the baseband signal to the multiplying unit 254. Also, the communication control unit 244 demodulates data (reflected pulse) from the baseband signal supplied from the detecting unit 257, and determines the unique data of the SAW tag 201 (detects bit data to which the unique data corresponds) on the basis of the demodulated data.

Thus, a transmitting and receiving unit having basically the same configuration and functions as the transmitting and receiving unit of a conventional tag reader can be applied as the transmitting and receiving unit 243.

The tag reader 202 to which the present embodiment is applied is divided into a portion for radio communication at the frequency f0 and a portion for radio transmission at the frequency f1.

The portion for radio communication at the frequency f0 is formed by a portion performing the corresponding functions of the antenna 241, the transmitting and receiving unit 243, and the communication control unit 244. The conventional tag reader can be applied as the portion for radio communication at the frequency f0.

On the other hand, the portion for radio transmission at the frequency f1 does not exist in the conventional tag reader, and is a portion newly provided for radio transmission at the frequency f1 of a tag read command to be described later, a signal for supplying power required when the SAW tag 201 reads the unique data, and the like. In other words, it can be said that the portion for radio transmission at the frequency f1 is added to the conventional tag reader. The portion for radio transmission at the frequency f1 includes the above-mentioned antenna 242, a multiplying unit 245, an oscillating unit 246, and a transmitting unit 247, as well as a part of the communication control unit 244 for performing a new function of generating information (information as a command and for supplying power to the SAW tag 201 as later described) for radio transmission at the frequency f1, and supplying the information as a baseband signal to the multiplying unit 245.

The communication control unit 244 of the present embodiment performs in synchronization the new function and the above-described functions of generating a check pulse, supplying the check pulse as a baseband signal to the multiplying unit 254, detecting a reflected pulse from a baseband signal supplied from the detecting unit 257 and determining the unique data of the SAW tag 201 on the basis of the reflected pulse.

Thus, a multiplying unit and a transmitting unit having basically the same configuration and function as, for example, the multiplying unit 254 and the transmitting unit 253, respectively, can be applied as the multiplying unit 245 and the transmitting unit 247, respectively. However, the oscillating unit 246 oscillates a signal at the frequency f1. Thus, the tag reader 202 is a radio communication apparatus for radio communication with a SAW tag 201 (FIG. 5 and FIG. 6) having the unique data. The tag reader 202 has the transmitting and receiving unit 243 and the antenna 241 for sequentially transmitting each of a plurality of check pulses (for example, check pulses 291 to 294 in FIG. 12 to be described later) for checking each piece of bit data including the unique data to the SAW tag 201 at predetermined time intervals (for example, time intervals Ta in FIG. 12 to be described later).

As described above, the SAW tag 201 excites a surface acoustic wave from the check pulse transmitted from the antenna 241, and controls whether to emit a reflected wave in response to the surface acoustic wave on the basis of the content of the bit data in the unique data to be checked by the check pulse. Hence, the antenna 241 and the transmitting and receiving unit 243 also receive a reflected wave emitted from the SAW tag 201.

The tag reader 202 further includes the communication control unit 244 for detecting the unique data by determining each piece of the corresponding bit data on the basis of whether a reflected wave is received in response to each of the plurality of check pulses transmitted earlier.

Thus, the tag reader 202 can reliably detect the specific information of the SAW tag 201 having the configuration shown in FIG. 6.

Incidentally, the check pulse is conventionally transmitted only once. In the present embodiment, on the other hand, at least the same number of check pulses are transmitted as there are bits of specific information. In other words, in the present embodiment, the transmission pulses transmitted from the tag reader to check (detect) each piece of the bit data including the unique data of the SAW tag 201 are check pulses.

Figure 8:
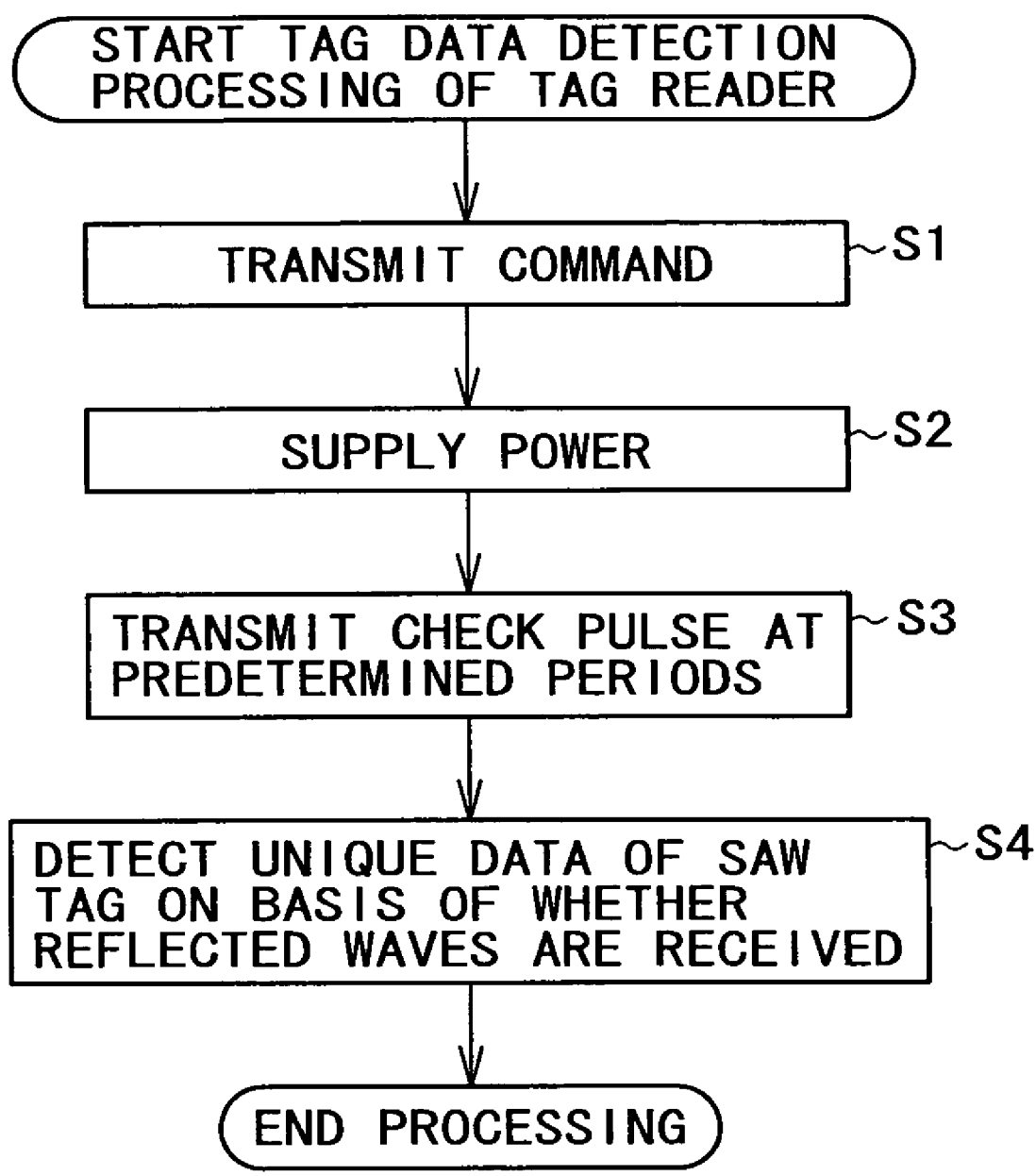
FIG. 8 is a flowchart of assistance in explaining an example of tag data detection processing by the tag reader in the RFID system of FIG. 5.
Figure 9:
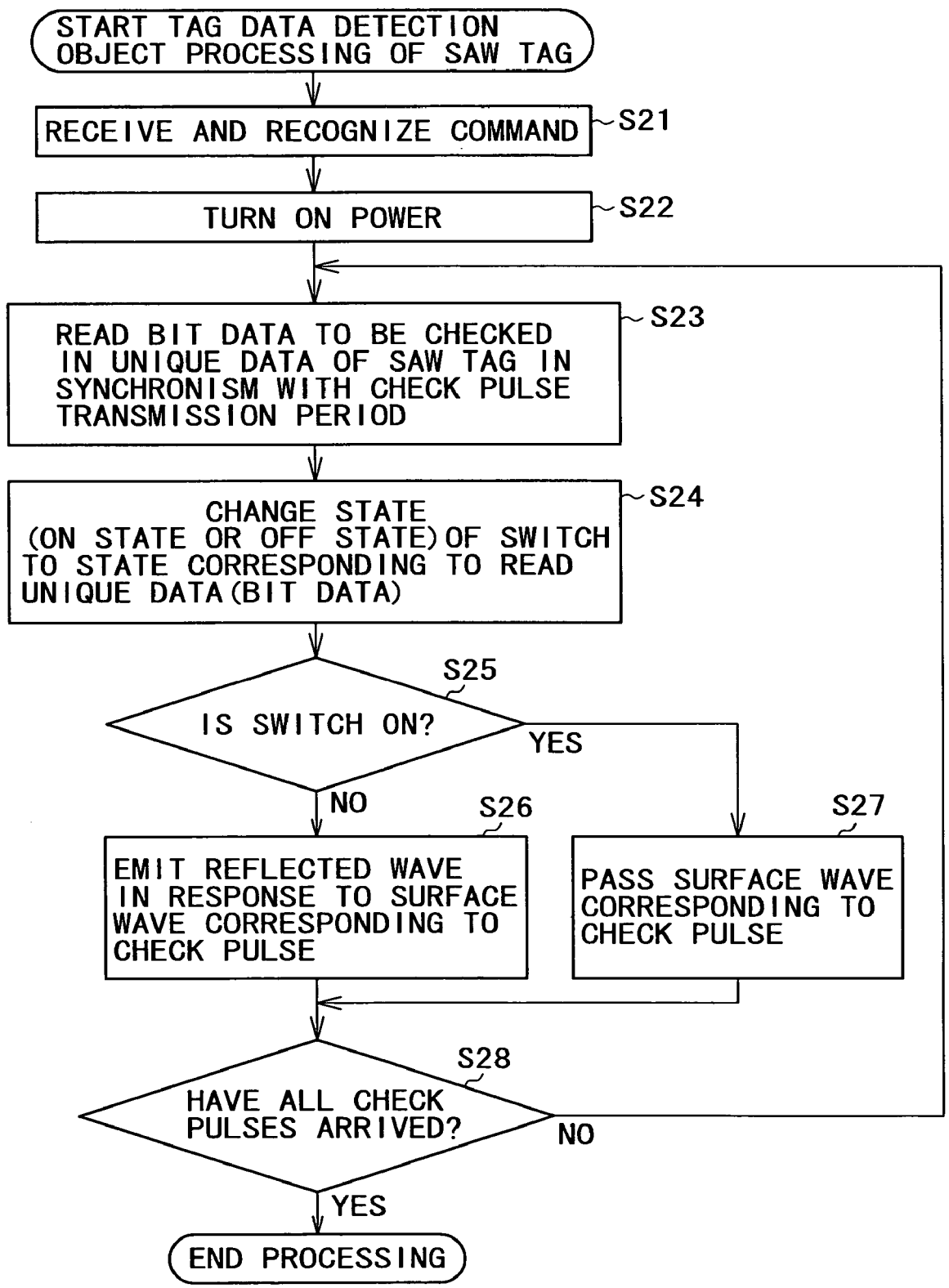
FIG. 9 is a flowchart of assistance in explaining an example of tag data detection object processing by the SAW tag in the RFID system of FIG. 5.
Figure 10:
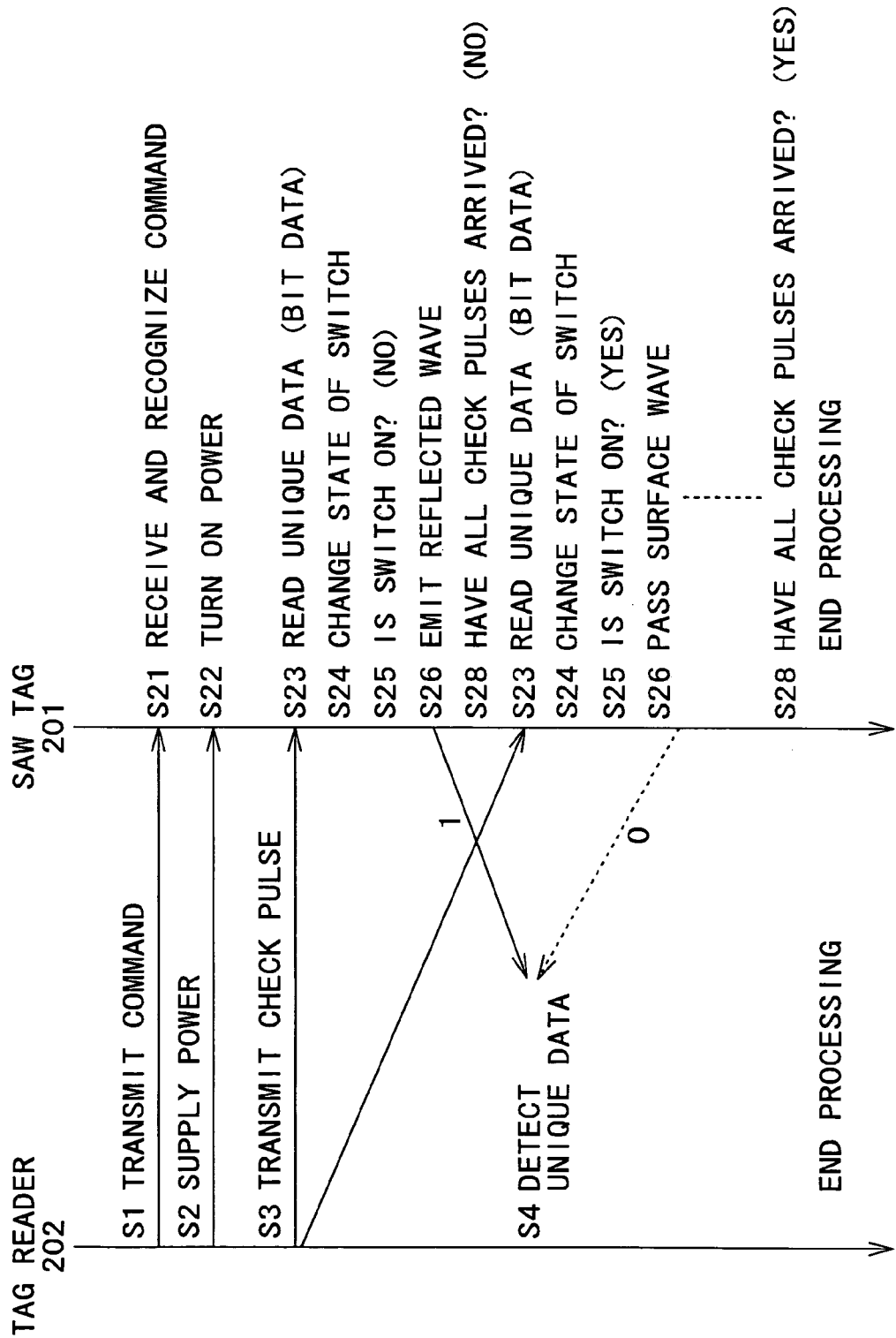
FIG. 10 is an arrow chart representing an example of the relationship between the processing of the tag reader and the processing of the SAW tag in the RFID system of FIG. 5.

A description will next be made of the processing for the tag reader 202 to recognize the SAW tag 201 in the RFID system of FIG. 5 to which the present embodiment is applied with reference to the flowcharts of FIG. 8 and FIG. 9 and the arrow chart of FIG. 10. The flowchart of FIG. 8 represents an example of processing on the tag reader 202 side (hereinafter referred to as tag data detection processing). FIG. 9 represents an example of processing on the SAW tag 201 side (hereinafter referred to as tag data detection object processing). FIG. 10 represents the relationship between the processing of the tag reader 202 and the processing of the SAW tag 201.

The tag data detection processing of the tag reader 202 and the tag data detection object processing of the SAW tag 201 will be individually described below in that order with reference to FIG. 8 and FIG. 9, respectively. The mutual processing relationship between the apparatuses can be readily understood by reference to corresponding steps in FIG. 10.

The tag data detection processing of the tag reader 202 will first be described with reference to FIG. 8.

At step S1, the tag reader 202 in FIG. 5 transmits a tag read command (reading of the unique data (tag data) of the SAW tag 201) to the SAW tag 201 via the antenna 242.

Specifically, as described above, the tag read command generated by the communication control unit 244 in FIG. 7 and converted into a baseband signal is modulated by the multiplying unit 245 using the f1 frequency signal supplied from the oscillating unit 246, and then transmitted as a radio wave via the transmitting unit 247 and the antenna 242.

After completing the transmission of the command, at step S2, the tag reader 202 supplies power to the SAW tag 201 via the antenna 242.

Specifically, after generating the tag read command, the communication control unit 244 next generates a signal for supplying the power required for the SAW tag 201 to read the unique data (hereinafter referred to as a power supply signal), and converts the signal into a baseband signal. The baseband signal (power supply signal) is modulated by the multiplying unit 245 using the f1 frequency signal supplied from the oscillating unit 246, and then supplied to the transmitting unit 247. The signal supplied to the transmitting unit 247 is amplified to become a transmitting signal having the energy necessary to supply the power, and then transmitted as a radio wave via the antenna 242.

Specifically, suppose that, as shown in FIG. 11, for example, the tag reader 202 transmits the tag read command 281 in a period from a time ta to substantially a time tb, and then transmits the power supply signal 282 from substantially the time tb. That is, FIG. 11 represents an example of signals transmitted by radio wave by the tag reader 202 at the f1 frequency via the antenna 242. The axis in the horizontal direction in FIG. 11 represents time.

As described later, after receiving and recognizing the tag read command 281, the SAW tag 201 turns on power using the power supply signal 282 transmitted after the tag read command (steps S21 and S22 in FIG. 9 and FIG. 10).

Incidentally, in this case, "turning on power" does not refer to special processing such as turning on a power supply switch, but "turning on power" refers to, for example, processing in which the rectifying unit 223 of FIG. 6 rectifies the radio wave of the power supply signal 282 received by the antenna 212 to generate and store internal energy, and supplies the energy to the memory 225 and the memory control unit 226.

At this time, the communication control unit 244 in the tag reader 202 of FIG. 7 generates a check pulse (transmitting pulse) in synchronization with the generation of the tag read command 281 and the power supply signal 282.

That is, after transmitting the tag read command, the tag reader 202 transmits check pulses to the SAW tag 201 at predetermined intervals via the antenna 241 at step S3 in FIG. 8 in synchronization with supplying the power to the SAW tag 201.

Specifically, as described above, the communication control unit 244 in FIG. 7 generates the check pulses and converts the check pulses into baseband signals, the transmitting and receiving unit 243 converts the baseband signals (check pulses) into transmitting signals of the operational frequency f0, and then the antenna 241 transmits the transmitting signals as radio waves.

More specifically, as shown in FIG. 12, for example, the tag reader 202 transmits the first check pulse 291 via the antenna 241 at substantially the time tb at which the transmission (transmission via the antenna 242) of the tag read command 281 is completed and the transmission (transmission via the antenna 242) of the power supply signal 282 is started. Thereafter, the tag reader 202 sequentially transmits check pulses via the antenna 241 at predetermined time intervals Ta. Specifically, the next check pulse 292 is transmitted from the antenna 241 at substantially a time td after passage of the time Ta from substantially the time tb. Then, the next check pulse 293 is transmitted from the antenna 241 at substantially a time tf after passage of the time Ta from substantially the time td. The last check pulse 294 is transmitted from the antenna 241 at substantially a time th after passage of the time Ta from substantially the time tf.

Incidentally, in the example of FIG. 12, the unique data is 4 bits for comparison with the conventional example, and consequently the check pulse 294 is the last check pulse; however, when the number of bits of the unique data is unknown or when the unique data is more than 4 bits, further check pulses are transmitted sequentially at time intervals Ta.

Though not specifically limited, the time interval Ta, or the check pulse transmission interval, is preferably determined by the velocity of the surface acoustic wave on the SAW tag 201.

As described above (as shown in FIG. 6), the SAW tag 201 reads bit data to be checked by the next check pulse in the unique data in synchronization with the check pulse transmission interval (at each interval of time Ta in this case), controls the state of the switch 216 on the basis of the content of the bit data, and thereby controls the reflection or passage at the reflection electrode 222 of a surface acoustic wave corresponding to each of the check pulses arriving sequentially.

Suppose that, for example, the unique data of the SAW tag 201 is 4-bit data "1101" as in the above-described conventional example.

In this case, as described later, when the first check pulse 291 (FIG. 12) is received by the antenna 211, the memory control unit 226 of the SAW tag 201 reads bit data "1" of the first bit of the unique data "1101" from the memory 225, and changes the switch 216 to a state corresponding to "1," that is, an off state. Then, both terminals of the reflection electrode 222 are open so that the reflection electrode 222 functions as a reflector to reflect a surface acoustic wave corresponding to the first check pulse 291, which wave is supplied from the interdigital electrode 221. That is, the reflection electrode 222 responds to the first check pulse 291 by emitting a reflected wave in response to the check pulse 291 (steps S24, S25 (NO), and S26 in FIG. 9 and FIG. 10).

When the next check pulse 292 (FIG. 12) is received by the antenna 211, the memory control unit 226 reads bit data "1" of the second bit of the unique data "1101" from the memory 225, and changes the switch 216 to the state corresponding to "1," that is, the off state (does not change the state from the previous state). Then, both terminals of the reflection electrode 222 are open so that the reflection electrode 222 functions as a reflector to reflect a surface acoustic wave corresponding to the check pulse 292, which wave is supplied from the interdigital electrode 221. That is, the reflection electrode 222 responds to the second check pulse 292 by emitting a reflected wave in response to the check pulse 292 (steps S24, S25 (NO), and S26 in FIG. 9 and FIG. 10).

When the next check pulse 293 (FIG. 12) is received by the antenna 211, the memory control unit 226 reads bit data "0" of the third bit of the unique data "1101" from the memory 225, and changes the switch 216 to the state corresponding to "0," that is, an on state. Then, both terminals of the reflection electrode 222 are short-circuited so that the reflection electrode 222 passes a surface acoustic wave corresponding to the check pulse 293, which wave is supplied from the interdigital electrode 221. That is, the reflection electrode 222 does not emit a reflected wave in response to the third check pulse 293 (steps S24, S25 (YES), and S27 in FIG. 9 and FIG. 10). In other words, it can be said that the reflection electrode 222 prohibits a response to the third check pulse 293.

When the last check pulse 294 (FIG. 12) is received by the antenna 211, the memory control unit 226 reads bit data "1" of the fourth bit of the unique data "1101" from the memory 225, and changes the switch 216 to the state corresponding to "1," that is, the off state. Then, both terminals of the reflection electrode 222 are open so that the reflection electrode 222 functions as a reflector to reflect a surface acoustic wave corresponding to the check pulse 294, which wave is supplied from the interdigital electrode 221. That is, the reflection electrode 222 responds to the fourth check pulse 294 by emitting a reflected wave in response to the check pulse 294 (steps S24, S25 (NO), and S26 in FIG. 9 and FIG. 10).

Thus, in synchronization with the arrival of a check pulse, the memory control unit 226 reads bit data to be checked by the check pulse in the unique data, and changes the state (the on state or the off state) of the switch 216 in correspondence with the value of the bit data. Thereby, the memory control unit 226 can make a setting to control the reflection or passage of a surface acoustic wave by the reflection electrode 222 so as to respond (emit a reflected wave) or prohibit response (pass the surface acoustic wave and not emit a reflected wave) to each check pulse.

That is, when the bit data in the unique data to be checked by the next check pulse is "1," the memory control unit 226 effects control to reflect a surface acoustic wave corresponding to the check pulse at the reflection electrode 222. Thus, the SAW tag 201 transmits a reflected wave (reflected pulse) via the antenna 211 as a response to the check pulse (surface acoustic wave).

On the other hand, when the bit data in the unique data to be checked by the next check pulse is "0," the memory control unit 226 effects control to pass a surface acoustic wave corresponding to the check pulse at the reflection electrode 222. Thus, the SAW tag 201 does not return a response to the check pulse (does not transmit a reflected wave in response to the check pulse (surface acoustic wave)).

Thus, when a reflected wave is transmitted from the SAW tag 201 in response to a predetermined check pulse, the tag reader 202 can determine that the bit data to be checked by the check pulse is "1," and when no reflected wave is transmitted from the SAW tag 201, the tag reader 202 can determine that the bit data to be checked by the check pulse is "0."

Accordingly, at step S4 in FIG. 8, the tag reader 202 detects the unique data of the SAW tag 201 on the basis of whether reflected waves are received from the SAW tag 201.

Specifically, in this case, for example, since a reflected wave is transmitted from the SAW tag 201 in response to the first check pulse 291 (that is, the check pulse 291 for checking the bit data of the first bit in the unique data of the SAW tag 201), as described above, the transmitting and receiving unit 243 of the tag reader 202 in FIG. 7 receives the reflected wave via the antenna 241, converts the reflected wave into a baseband signal, and then supplies the baseband signal to the communication control unit 244. As shown in FIG. 12, the communication control unit 244 detects a reflected pulse 301 by demodulating the baseband signal at substantially a time tc. In such a case (in a case where a reflected pulse is detected), the communication control unit 244 determines that the data to be checked by the check pulse 291 generated (transmitted) at substantially the time tb, that is, the bit data of the first bit in the unique data of the SAW tag 201, is "1."

Since a reflected wave is also transmitted from the SAW tag 201 in response to the next check pulse 292 (that is, the check pulse 292 for checking the bit data of the second bit in the unique data of the SAW tag 201), the transmitting and receiving unit 243 receives the reflected wave via the antenna 241, converts the reflected wave into a baseband signal, and then supplies the baseband signal to the communication control unit 244. The communication control unit 244 detects a reflected pulse 302 by demodulating the baseband signal at substantially a time te. The communication control unit 244 determines that the data to be checked by the check pulse 292 generated (transmitted) at substantially the time td, that is, the bit data of the second bit in the unique data of the SAW tag 201, is "1."

Next, since no reflected wave is transmitted from the SAW tag 201 in response to the check pulse 293 transmitted at substantially the time tf (that is, the check pulse 293 for checking the bit data of the third bit in the unique data of the SAW tag 201), the communication control unit 244 cannot detect a reflected pulse 303 corresponding to the check pulse 293, even when substantially a time tg arrives. In such a case (in a case where no reflected wave is received even when a predetermined time has passed after the transmission of the check pulse), the communication control unit 244 determines that the data to be checked by the check pulse 293 generated (transmitted) at substantially the time tf, that is, the bit data of the third bit in the unique data of the SAW tag 201, is "0."

Since a reflected wave is transmitted from the SAW tag 201 in response to the check pulse 294 transmitted last (at substantially the time th) (that is, the check pulse 294 for checking the bit data of the fourth bit in the unique data of the SAW tag 201), the transmitting and receiving unit 243 receives the reflected wave via the antenna 241, converts the reflected wave into a baseband signal, and then supplies the baseband signal to the communication control unit 244. The communication control unit 244 detects a reflected pulse 304 by demodulating the baseband signal at substantially a time ti. The communication control unit 244 determines that the data to be checked by the check pulse 294 generated (transmitted) at substantially the time th, that is, the bit data of the fourth bit in the unique data of the SAW tag 201, is "1."

When detecting that the unique data of the SAW tag 201 is "1101," that is, when the processing at step S4 is completed, the communication control unit 244 ends the tag data detection processing.

The tag data detection object processing of the SAW tag 201 as related to the above-described tag data detection processing of the tag reader 202 will next be described with reference to FIG. 9.

As described above, in the processing at step S1 (FIG. 8 and FIG. 10), the tag reader 202 in FIG. 5 transmits the tag read command 281 in FIG. 11 to the SAW tag 201 via the antenna 242.

Then, at step S21, the SAW tag 201 in FIG. 5 receives the tag read command 281 via the antenna 212, and recognizes the tag read command 281.

Specifically, as shown in FIG. 6 described above, when the antenna 212 receives the tag read command 281 transmitted from the tag reader 202 as a radio wave of the frequency f1, the rectifying unit 223 rectifies the radio wave to generate and store internal energy. Using this energy, the control unit 224 recognizes the tag read command 281, and issues a tag read instruction (that is, reading of the unique data of the SAW tag 201) to the memory control unit 226.

As described above, after completing the transmission of the tag read command 281, the tag reader 202 next transmits the power supply signal 282 in FIG. 11 to the SAW tag 201 via the antenna 242 in the processing at step S2 (FIG. 8 and FIG. 10).

Then, at step S22, the SAW tag 201 turns on power using the power supply signal 282.

Specifically, as described above, when the antenna 212 receives the power supply signal 282 transmitted from the tag reader 202 as a radio wave of the frequency f1, the rectifying unit 223 rectifies the radio wave of the power supply signal 282 received by the antenna 212 to generate and store internal energy. This energy is supplied as power to the memory 225 and the memory control unit 226.

At this time, as described above, the tag reader 202 sequentially transmits check pulses at predetermined intervals (at time intervals Ta in FIG. 12 in this case) in the processing at step S3 (FIG. 8 and FIG. 10).

That is, after transmitting the tag read command, the tag reader 202 transmits the check pulses to the SAW tag 201 via the antenna 241 at predetermined intervals at step S3 in synchronization with supplying the power to the SAW tag 201.

Then, at step S23, the SAW tag 201 reads bit data to be checked in the unique data of the SAW tag 201 in synchronization with the check pulse transmission intervals. At step S24, the SAW tag 201 changes the state (the on state or the off state) of the internal switch 216 to a state corresponding to the read unique data (bit data).

Specifically, since the unique data in this case is "1101," in synchronization with the transmission of the first check pulse 291 (FIG. 12), the memory control unit 226 reads the bit data to be checked by the first check pulse 291, that is, the bit data "1" of the first bit of the unique data, and then supplies a high-level signal corresponding to the bit data "1" to the inverter 215. The inverter 215 inverts the high-level signal into a low-level signal, and then supplies the low-level signal to the switch 216. Then, the switch 216 is changed to the off state.

At this time, the reflection electrode 222 determines at step S25 whether the switch is in the on state. It is to be noted that the reflection electrode 222 does not perform the determination processing actively, and that in practice, only a state of connection (an open state or a short-circuited state) of both terminals of the reflection electrode 222 is changed passively; in this case, however, it is assumed that the reflection electrode 222 determines at step S25 that the switch is in the off state when both terminals of the reflection electrode 222 are open, and it is assumed that the reflection electrode 222 determines at step S25 that the switch is not in the off state (the switch is in the on state) when both terminals of the reflection electrode 222 are short-circuited.

Thus, in this case, the reflection electrode 222 determines at step S25 that the switch is not in the on state (the switch is in the off state). At step S26, the reflection electrode 222 emits a reflected wave in response to a surface acoustic wave corresponding to the check pulse 291, the surface acoustic wave being supplied from the interdigital electrode 221.

As described above, the reflected wave is transmitted as a radio wave of the operational frequency f0 via the interdigital electrode 221 and the antenna 211, and then received by the tag reader 202. The tag reader 202 detects the reflected wave as the reflected pulse 301 in response to the check pulse 291, and thus determines that the data to be checked by the check pulse 291, that is, the bit data of the first bit in the unique data of the SAW tag 201, is "1."

At step S28, the memory control unit 226 determines whether all the check pulses have arrived.

Specifically, since the unique data in this case is 4-bit data, the memory control unit 226 determines at step S28 whether the four check pulses have arrived (more specifically, whether the bit data of the fourth (last) bit of the unique data has been read), and thus determines whether all the check pulses have arrived.

In this case, since only the first check pulse 291 has arrived, the memory control unit 226 determines at step S28 that not all the check pulses have arrived, and the processing returns to step S23 to repeat the processing from step S23 on down.

Specifically, in the processing at steps S23 and S24, the SAW tag 201 reads the bit data "1" of the second bit of the unique data "1101" in synchronization with the transmission of the second check pulse 292, and the switch 216 is changed to the state corresponding to "1," that is, the off state. Then, both terminals of the reflection electrode 222 are open (the reflection electrode 222 determines at step S25 that the switch is not in the on state (the switch is in the off state)). At step S26, the reflection electrode 222 emits a reflected wave in response to a surface acoustic wave corresponding to the check pulse 292, the surface acoustic wave being supplied from the interdigital electrode 221.

At this point, since only the second check pulse 292 has arrived, the memory control unit 226 determines at step S28 that not all the check pulses have arrived, and the processing returns to step S23 to repeat the processing from step S23 on down.

Specifically, in the processing at steps S23 and S24, the SAW tag 201 reads the bit data "0" of the third bit of the unique data "1101" in synchronization with the transmission of the third check pulse 293, and the switch 216 is changed to the state corresponding to "0," that is, the on state. Then, both terminals of the reflection electrode 222 are short-circuited (the reflection electrode 222 determines at step S25 that the switch is in the on state). At step S27, the reflection electrode 222 passes a surface acoustic wave corresponding to the check pulse 293, the surface acoustic wave being supplied from the interdigital electrode 221. That is, the reflection electrode 222 does not emit a reflected wave.

At this point, since only the third check pulse 293 has arrived, the memory control unit 226 determines at step S28 that not all the check pulses have arrived, and the processing returns to step S23 to repeat the processing from step S23 on down.

Specifically, in the processing at steps S23 and S24, the SAW tag 201 reads the bit data "1" of the fourth bit of the unique data "1101" in synchronization with the transmission of the fourth (or last) check pulse 294, and the switch 216 is changed to the state corresponding to "1," that is, the off state. Then, both terminals of the reflection electrode 222 are open (the reflection electrode 222 determines at step S25 that the switch is not in the on state (the switch is in the off state)). At step S26, the reflection electrode 222 emits a reflected wave in response to a surface acoustic wave corresponding to the check pulse 294, the surface acoustic wave being supplied from the interdigital electrode 221.

At this point, the last (fourth) check pulse 294 has arrived, and the processing corresponding to the check pulse 294 has been completed. Therefore, the memory control unit 226 determines at step S28 that all the check pulses have arrived, whereby the tag data detection object processing is ended.

Thus, as shown in FIG. 5, in the RFID system as the radio communication system to which the present embodiment is applied, the tag reader 202 and the SAW tag 201 having unique data for identifying the SAW tag 201 itself perform radio communication with each other, so that the tag reader 202 detects the unique data of the SAW tag 201 and thereby recognizes the SAW tag 201.

Specifically, the tag reader 202 sequentially transmits to the SAW tag 201 at predetermined time intervals each of a plurality of check pulses for checking each piece of bit data including the unique data.

The SAW tag 201 sets whether to respond to the next check pulse to be transmitted by the tag reader 202 on the basis of the content of the bit data in the unique data to be checked by the check pulse.

When a check pulse to which a setting is made to respond is transmitted from the tag reader 202, the SAW tag 201 responds to the check pulse by exciting a surface acoustic wave from the check pulse and reflecting the surface acoustic wave. When a check pulse to which a setting is made to prohibit response is transmitted from the tag reader 202, the SAW tag 201 prohibits a response to the check pulse by exciting a surface acoustic wave from the check pulse and passing the surface acoustic wave.

The tag reader 202 detects the unique data by determining each piece of the corresponding bit data on the basis of whether there is a response from the SAW tag 201 to each of the plurality of check pulses transmitted.

Thus, the SAW tag 201 requires only one reflection electrode 222 to represent the unique data, so that the SAW tag 201, which is a small-sized and high-capacity data tag utilizing features of the conventional SAW tag, can be readily realized. In addition, since the SAW tag 201 can emit a reflected pulse not attenuated with respect to the amplitude of a check pulse transmitted from the tag reader 202, the tag reader 202 can reliably recognize the SAW tag 201. Therefore, the RFID system to which the present embodiment is applied can solve the above-described conventional problems.

Figure 1:
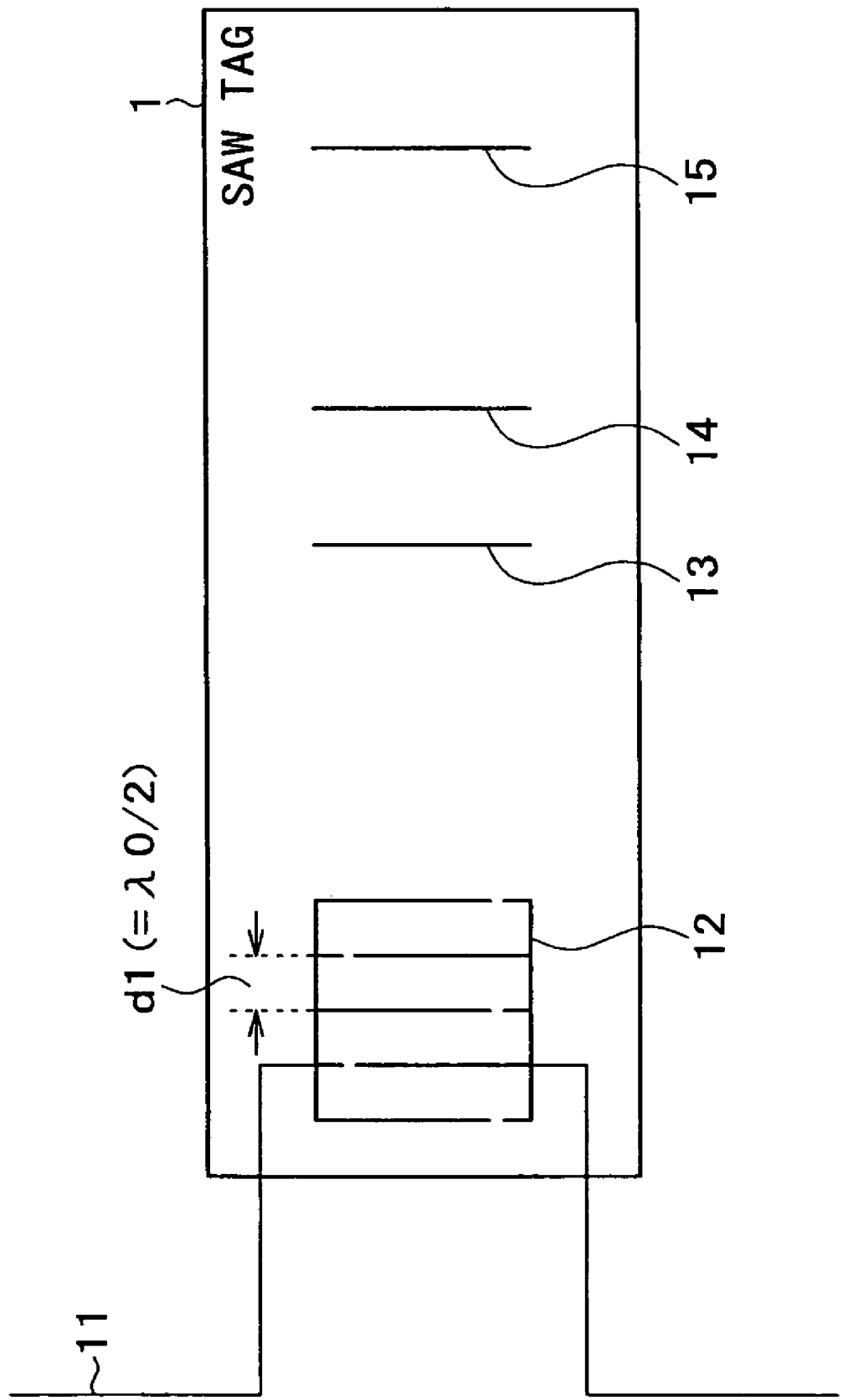
FIG. 1 is a block diagram showing an example of the configuration of a conventional SAW tag.
Figure 2:
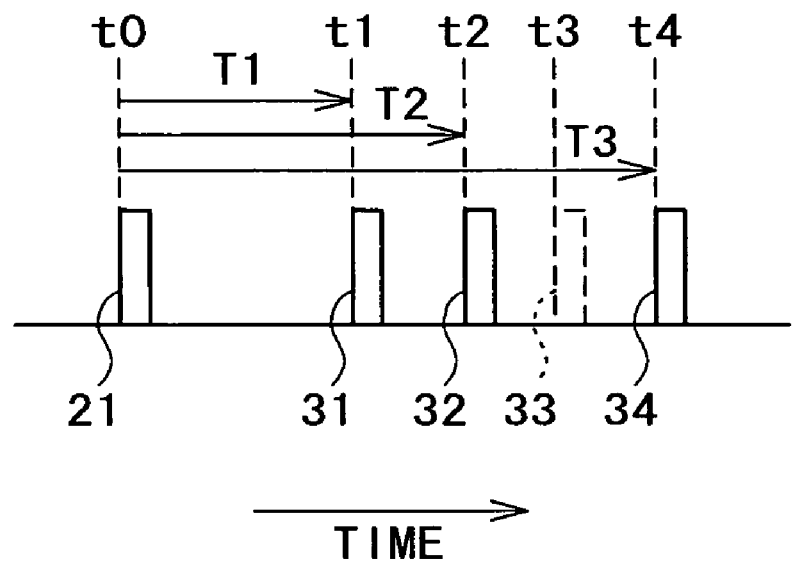
FIG. 2 is a diagram of assistance in explaining the operation of an RFID system using the conventional SAW tag of FIG. 1.
Figure 3:
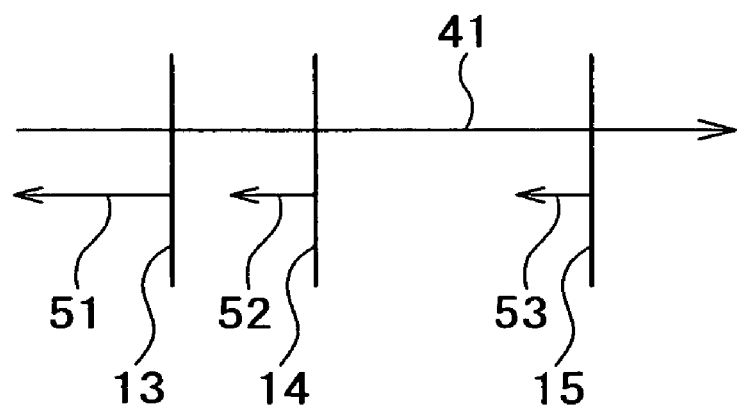
FIG. 3 is another diagram of assistance in explaining the operation of the RFID system using the conventional SAW tag of FIG. 1.
Figure 4:
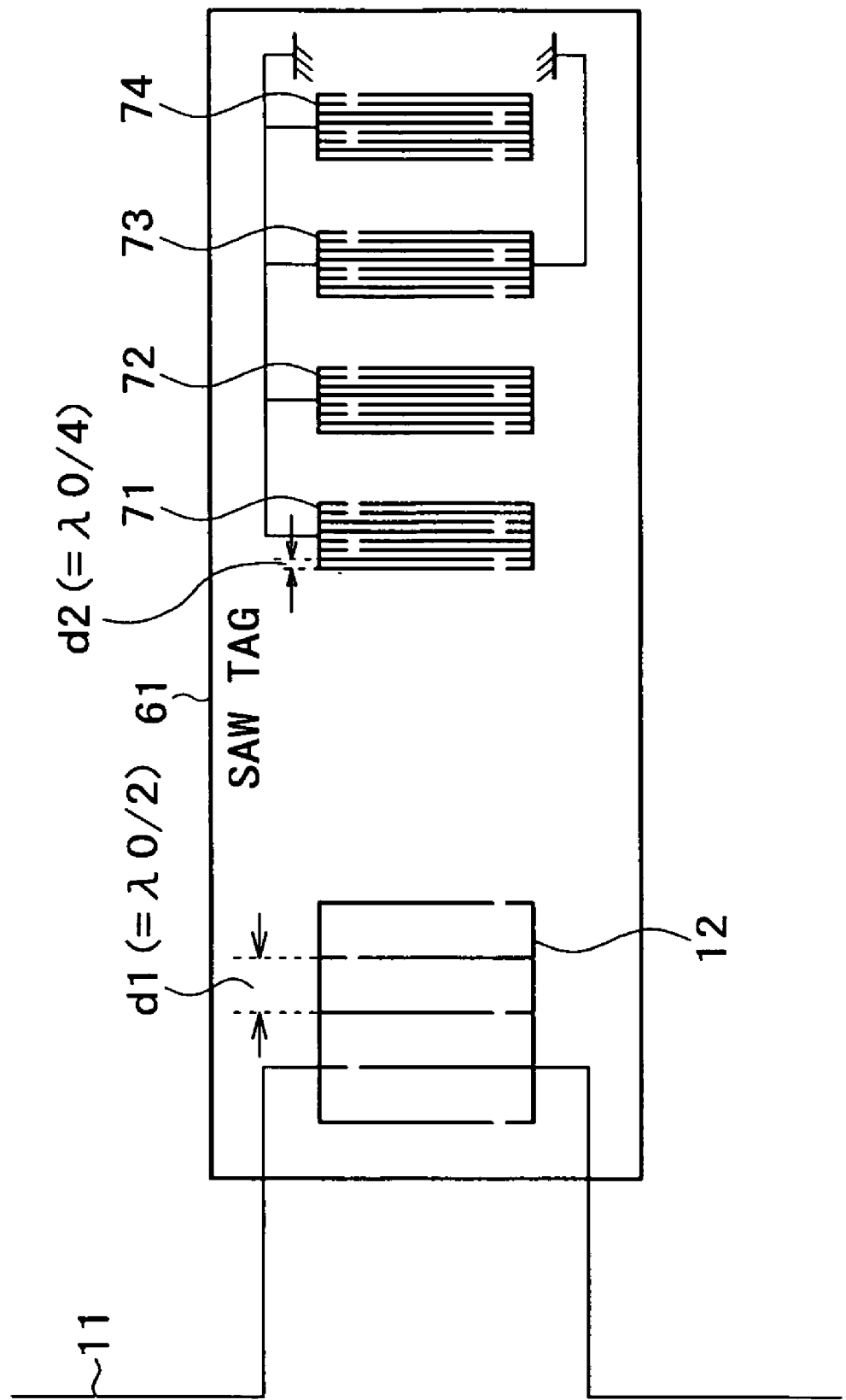
FIG. 4 is a block diagram showing another example of the configuration of a conventional SAW tag.

Further, only one predetermined piece of unique data (one piece of data "1101" in the examples of FIG. 1 and FIG. 4) can be read from the conventional SAW tags formed as shown in FIG. 1 and FIG. 4, because of the structure of the conventional SAW tags. Alternatively, in order to allow reading of a plurality of pieces of data, a corresponding number of reflection electrodes need to be disposed on the SAW tag, thus increasing the physical size of the SAW tag. On the other hand, the present embodiment can produce another effect of being able to read a plurality of pieces of data from one SAW tag when a plurality of pieces of data (which are arbitrary bit data, and not specifically limited to unique data) are stored in the memory of the SAW tag, the tag reader gives a command to read one of the plurality of pieces of data to the SAW tag, and the SAW tag recognizes the command.

Incidentally, while in the present embodiment, power for reading the memory is supplied by a radio wave of the frequency f1 different from the transmission frequency (that is, the operational frequency f0) of the unique data of the SAW tag 201, the power may be supplied by light instead of a radio wave. That is, while the power to the SAW tag 201 is supplied from the tag reader 202 as described above, the form of supplying the power is not specifically limited, and radio waves of various frequencies (wavelengths) or light can be used.

Further, while a description has been made of the example in which the tag reader 202 reads the unique data of the SAW tag 201, it is, of course, possible to write data readily to the memory of the SAW tag 201. That is, a readable and writable SAW tag 201 can be readily realized.

The series of processes described above can be carried out not only by hardware but also by software. In this case, the tag control unit 214 in the SAW tag 201 of FIG. 6 and the communication control unit 244 in the tag reader 202 of FIG. 7 described above can also be formed as shown in FIG. 13, for example.

A CPU (Central Processing Unit) 401 in FIG. 13 performs various processing according to a program stored in a ROM (Read Only Memory) 402 or a program loaded from a storage unit 408 into a RAM (Random Access Memory) 403. The RAM 403 also stores data and the like necessary for the CPU 401 to perform various processing, as required.

The CPU 401, the ROM 402, and the RAM 403 are interconnected via a bus 404. The bus 404 is also connected with an input-output interface 405.

As required, the input-output interface 405 is connected with an input unit 406 formed by a keyboard, a mouse and the like, an output unit 407 formed by a display or the like, and the storage unit 408 formed by a hard disk or the like.

The input-output interface 405 is also connected with a communication connecting unit 409. In the case of the communication connecting unit 409 in the tag control unit 214 in FIG. 6, the communication connecting unit 409 is connected with the antenna 212 and the inverter 215, for example. In the case of the communication connecting unit 409 in the communication control unit 244 in FIG. 7, the communication connecting unit 409 is connected with the transmitting and receiving unit 243 and the multiplying unit 245, for example.

When necessary, the input-output interface 405 is also connected with a drive 410, into which a removable recording medium 411 formed by a magnetic disk, an optical disk, a magneto-optical disk, a semiconductor memory or the like is inserted as required. A computer program read from the removable recording medium 411 is installed in the storage unit 408 as required.

When the series of processes is to be carried out by software, a program including the software is installed from a network or a recording medium onto a computer incorporated in special hardware, or, for example, a general-purpose personal computer that can perform various functions by installing various programs thereon.

As shown in FIG. 13, the recording medium is not only formed by the removable recording medium (packaged medium) 411 distributed to users to provide the program separately from the apparatus proper, the removable recording medium 411 including a magnetic disk (including floppy disks), an optical disk (including a CD-ROM (Compact Disk-Read Only Memory) and a DVD (Digital Versatile Disk)), a magneto-optical disk (including an MD (Mini-Disk)), a semiconductor memory or the like which has the program recorded thereon, but also may be formed by the ROM 402, the hard disk included in the storage unit 408, or the like which has the program recorded thereon and is provided to the user in a state of being preincorporated in the apparatus proper.

It is to be noted that in the present specification, the steps describing the program recorded on the recording medium include not only processing carried out in time series in the described order, but also processing carried out in parallel or individually and not necessarily in time series.

Also, in the present specification, a system refers to an apparatus as a whole formed by a plurality of apparatuses and processing units.

As described above, according to the present invention, an RFID system using SAW can be utilized. In particular, a SAW tag can be miniaturized, and a tag reader can reliably detect the SAW tag.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A communication system, comprising:
    a first communication apparatus; and
    a second communication apparatus associated with a unique data value formed of a sequence of bits;
    said first communication apparatus including:
    transmitting means for transmitting a first signal from the first communication apparatus to the second communication apparatus using an electromagnetic wave of a first operational frequency, the first signal being a command, for transmitting a further signal from the first communication apparatus to the second communication apparatus using the electromagnetic wave of the first operational frequency after said transmitting of the first signal, and for transmitting a sequence of check pulses to said second communication apparatus concurrent with said transmitting of the further signal using an electromagnetic wave of a second operational frequency whereby a given one of the sequence of check pulses is transmitted at a predetermined time interval after the transmitting of its immediately preceding check pulse;

said second communication apparatus including:

using means for using the received further signal to generate internal power in response to receiving the first signal, generating means for generating an associated surface acoustic wave whenever one of the sequence of check pulses is received, determining means for determining whether to respond to a particular one of the sequence of check pulses based on a value of a given one of the sequence of bits, said determining being carried out for each one of the sequence of bits, and responding means for reflecting the surface acoustic wave when said determining means determines that said second communication apparatus is to respond to the associated check pulse, and for allowing the surface acoustic wave to pass when said determining means determines that said second communication apparatus is not to respond to the associated check pulse;

said first communication apparatus further including:

determining means for determining the values of each one of the sequence of bits by detecting, for each one of the sequence of transmitted check pulses, whether there is a response from said second communication apparatus.

2. A method of communicating between a first communication apparatus and a second communication apparatus, the second communication apparatus being associated with a unique data value formed of a sequence of bits said method comprising:

transmitting a first signal from the first communication apparatus to the second communication apparatus using an electromagnetic wave of a first operational frequency, the first signal being a command;

transmitting, after said transmitting of the first signal, a further signal from the first communication apparatus to the second communication apparatus using the electromagnetic wave of the first operational frequency, the further signal being used by the second communication apparatus to generate internal power in response to receiving the first signal;

transmitting, concurrent with said transmitting of the further signal, a sequence of check pulses from the first communication apparatus to the second communication apparatus using an electromagnetic wave of a second operational frequency whereby a given one of the sequence of check pulses is transmitted at a predetermined time interval after the transmitting of its immediately preceding check pulse;

determining, at the second communication apparatus, whether to respond to a particular one of the sequence of check pulses based on a value of a given one of the sequence of bits, said determining step being carried out for each one of the sequence of bits;

generating an associated surface acoustic wave at the second communication apparatus whenever one of the sequence of check pulses is received;

reflecting the surface acoustic wave when a said determining step determines that the second communication apparatus is to respond to its associated check pulse, and allowing the excited surface acoustic wave to pass said determining step determines that the second communication apparatus is not to respond to the associated check pulse; and determining, at the first communication apparatus, the values of one of the sequence of bits by detecting, for each one of the sequence of transmitted check pulses, whether there is a response from the second communication apparatus.

3. A first communication apparatus for communicating with a second communication apparatus, the second communication apparatus being associated with a unique data value formed of a sequence of bits, said first communication apparatus comprising:

transmitting means for transmitting a first signal from the first communication apparatus to the second communication apparatus using an electromagnetic wave of a first operational frequency, the first signal being a command, for transmitting a further signal from the first communication apparatus to the second communication apparatus using the electromagnetic wave of the first operational frequency after said transmitting of the first signal whereby the second communication apparatus uses the further signal to generate internal power in response to receiving the first signal, and for transmitting a sequence of check pulses to the second communication apparatus concurrent with said transmitting of the further signal using an electromagnetic wave of a second operational frequency whereby a given one of the sequence of check pulses is transmitted at a predetermined time interval after the transmitting of its immediately preceding check pulse;

receiving means for receiving an associated surface acoustic wave emitted from the second communication apparatus in response to specific ones of the plurality of check pulses; and determining means for determining the values of each one of the sequence of bits by detecting, for each one of the sequence of transmitted check pulses, whether said receiving means has received the associated surface acoustic wave in response thereto.

4. A first communication apparatus as claimed in claim 3, wherein the electromagnetic wave of the second operational frequency is a light wave having an energy corresponding to the internal power.

5. A method of communicating with a communication apparatus associated with a unique data value formed of a sequence of bits said method comprising:

transmitting a first signal to the communication apparatus using an electromagnetic wave of a first operational frequency, the first signal being a command;

transmitting, after said transmitting of the first signal, a further signal to the communication apparatus using the electromagnetic wave of the first operational frequency whereby by the communication apparatus uses the further signal to generate internal power in response to receiving the first signal;

transmitting, concurrent with said transmitting of the further signal, a sequence of check pulses to the communication apparatus using an electromagnetic wave of a second operational frequency whereby a given one of the sequence of check pulses is transmitted at a predetermined time interval after the transmitting of its immediately preceding check pulse;

receiving an associated surface wave from the communication apparatus in response to specific one of the sequence of surface acoustic waves; and determining the values of each one of the sequence of bits by detecting, for each one of the sequence of transmitted check pulses, whether the associated surface wave was received response thereto.

6. A first communication apparatus for communicating with a second communication apparatus, said first communication apparatus being associated with a unique data value formed of a sequence of bits, said first communication apparatus comprising:

receiving means for receiving a first signal using an electromagnetic wave of a first operational frequency from the second communication apparatus, the first signal being a command, and for receiving a further signal using the electromagnetic wave of the first operational frequency from the second communication apparatus after said receiving of the first signal;

using means for using the further signal to generate internal power in response to receiving the first signal;

said receiving means for receiving a sequence of check pulses from the second communication apparatus using an electromagnetic wave of a second operational frequency concurrent with said receiving of the further signal whereby a given one of the sequence of check pulses is receiving at a predetermined time interval after the receiving of its immediately preceding check pulse;

generating means for generating an associated surface acoustic wave whenever one of the sequence of check pulses transmitted is received;

determining means for determining whether to respond to a particular one of the sequence of check pulses based on a value of a given one of the sequence of bits, said determining step being carried out for each one of the sequence of bits; and responding means for reflecting the surface acoustic wave when said determining means determines that said first communication apparatus is to respond to its associated check pulse, and for allowing the surface acoustic wave to pass when said determining means determines that said first communication apparatus is not to respond to the associated check pulse.

7. A first communication apparatus as claimed in claim 6, wherein said responding means includes:

a reflection electrode having a pair of terminals, said reflection electrode reflecting the associated surface acoustic wave when said pair of terminals is open and allowing the surface associated acoustic wave to pass when said pair of terminals is short-circuited, and a switch connected to said pair of terminals, wherein said determining_means operates said switch to open said pair of terminals when said determining means determines that said first communication apparatus is to respond to the associated check pulse and operates said switch to short-circuit said pair of terminals when said determining determines that said first communication apparatus is not to respond to the associated check pulse.

8. A first communication apparatus as claimed in claim 6, further comprising:

storing means for storing the unique data value.

9. A first communication apparatus as claimed in claim 6, wherein the electromagnetic wave of the second operational frequency is a light wave having an energy corresponding to the internal power generated by said using means.

10. A method of communicating with a communication apparatus to provide the communication apparatus with a unique data value formed of bits said comprising:

receiving a first signal using an electromagnetic wave of a first operational frequency from the second communication apparatus, the first signal being a command;

receiving a further signal using the electromagnetic wave of the first operational frequency from the second communication apparatus after said receiving of the first signal;

using the further signal to generate internal power in response to receiving the first signal;

receiving a sequence of check pulses from the second communication apparatus using an electromagnetic wave of a second operational frequency concurrent with said receiving of the further signal whereby a given one of the sequence of check pulses is receiving at a predetermined time interval after the receiving of its immediately preceding check pulse;

generating an associated surface acoustic wave whenever one of the sequence of check pulses is received;

determining whether to respond to a particular one of the sequence of check pulses based on a value of a given one of the sequence of bits, said determining step being carried out for each one of the sequence of bits; and reflecting the surface acoustic wave when said determining step determines that its associated check pulse is to have a response and allowing the surface acoustic wave to pass when said determining step determines that the associated check pulse is not to have a response.

11. A computer-readable medium recorded with instructions for carrying out a method of communicating between a first communication apparatus and a second communication apparatus, the second communication apparatus being associated with a unique data value formed of a sequence of bits, said method comprising:

transmitting a first signal from the first communication apparatus to the second communication apparatus using an electromagnetic wave of a first operational frequency, the first signal being a command;

transmitting, after said transmitting of the first signal, a further signal from the first communication apparatus to the second communication apparatus using the electromagnetic wave of the first operational frequency, the further signal being used by the second communication apparatus to generate internal power in response to receiving the first signal;

transmitting, concurrent with said transmitting of the further signal, a sequence of check pulses from the first communication apparatus to the second communication apparatus using an electromagnetic wave of a second operational frequency whereby a given one of the sequence of check pulses is transmitted at a predetermined time interval after the transmitting of its immediately preceding check pulse;

determining, at the second communication apparatus, whether to respond to a particular one of the sequence of check pulses based on a value of a given one of the sequence of bits, said determining step being carried out for each one of the sequence of bits;

generating an associated surface acoustic wave at the second communication apparatus whenever one of the sequence of check pulses is received;

reflecting the surface acoustic wave when said determining step determines that the second communication apparatus is to respond to its associated check pulse, and allowing the excited surface acoustic wave to pass when said determining step determines that the second communication apparatus is not to respond to the associated check pulse; and determining, at the first communication apparatus, the values of each one of the sequence of bits by detecting, for each one of the sequence of transmitted check pulses, whether there is a response from the second communication apparatus.

12. A computer-readable medium recorded with instructions for carrying out a method of communicating with a communication apparatus associated with a unique data value formed of a sequence of bits, said method comprising:

transmitting a first signal to the communication apparatus using an electromagnetic wave of a first operational frequency, the first signal being a command;

transmitting, after said transmitting of the first signal, a further signal to the communication apparatus using the electromagnetic wave of the first operational frequency whereby by the communication apparatus uses the further signal to generate internal power in response to receiving the first signal;

transmitting, concurrent with said transmitting of the further signal, a sequence of check pulses to the communication apparatus using an electromagnetic wave of a second operational frequency whereby a given one of the sequence of check pulses is transmitted at a predetermined time interval after the transmitting of its immediately preceding check pulse;

receiving an associated surface wave from the communication apparatus in response to specific one of the sequence of surface acoustic waves; and determining the values of each one of the sequence of bits by detecting, for each one of the sequence of transmitted check pulses, whether the associated surface wave was received in response thereto.

13. A computer-readable medium recorded with instructions for carrying out a method of communicating with a communication apparatus to provide the communication apparatus with a unique data value formed of bits, said comprising:

receiving a first signal using an electromagnetic wave of a first operational frequency from the second communication apparatus, the first signal being a command;

receiving a further signal using the electromagnetic wave of the first operational frequency from the second communication apparatus after said receiving of the first signal;

using the further signal to generate internal power in response to receiving the first signal;

receiving a sequence of check pulses from the second communication apparatus using an electromagnetic wave of a second operational frequency concurrent with said receiving of the further signal whereby a given one of the sequence of check pulses is receiving at a predetermined time interval after the receiving of its immediately preceding check pulse;

generating an associated surface acoustic wave whenever one of the sequence of check pulses is received;

determining whether to respond to a particular one of the sequence of check pulses based on a value of a given one of the sequence of bits, said determining step being carried out for each one of the sequence of bits; and reflecting the surface acoustic wave when said determining step determines that its associated check pulse is to have a response and allowing the surface acoustic wave to pass when said determining step determines that the associated check pulse is not to have a response.

* * * * *

UNITED STATES PATENT AND TRADEMARK OFFICE
CERTIFICATE OF CORRECTION

PATENT NO. : 7,151,437 B2  Page 1 of 1
APPLICATION NO. : 10/824300
DATED : December 19, 2006
INVENTOR(S) : Kunio Fukuda It is certified that error appears in the above-identified patent and that said Letters Patent is hereby corrected as shown below:

Column 2, line 23, "differ" should read --differs--.
Column 24, line 69, after "command,", insert --and--.
Column 25, line 31, after "bits", insert --,--.
Column 25, line 61, after "when", delete "a".
Column 25, line 64, after "pass", insert --when--.
Column 26, line 15, after "command", delete ",".
Column 26, line 44, after "bits", insert --,--.
Column 26, line 51, after "whereby", delete "by".
Column 26, line 62, "one" should read --ones--.
Column 26, line 67, after "received", insert --in--.
Column 27, line 20, "receiving" should read --received--.
Column 27, line 51, after "determining", insert --means--.
Column 27, line 64, after "bits", insert --,--.
Column 27, line 64 after "said", insert --method--.
Column 28, line 11, "receiving" should read --received--.
Column 29, line 14, after "whereby", delete "by".
Column 29, line 25, "one" should read --ones--.
Column 30, line 2, after "said", insert --method--.
Column 30, line 17, "receiving" should read --received--.

Signed and Sealed this

Fourth Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 7,151,437 B2  Page 1 of 1
APPLICATION NO. : 10/824300
DATED : December 19, 2006
INVENTOR(S) : Kunio Fukuda It is certified that error appears in the above-identified patent and that said Letters Patent is hereby corrected as shown below:

Column 2, line 23, "differ" should read --differs--.
Column 24, line 59, after "command,", insert --and--.
Column 25, line 31, after "bits", insert --,--.
Column 25, line 61, after "when", delete "a".
Column 25, line 64, after "pass", insert --when--.
Column 26, line 15, after "command", delete ",".
Column 26, line 44, after "bits", insert --,--.
Column 26, line 51, after "whereby", delete "by".
Column 26, line 62, "one" should read --ones--.
Column 26, line 67, after "received", insert --in--.
Column 27, line 20, "receiving" should read --received--.
Column 27, line 51, after "determining", insert --means--.
Column 27, line 64, after "bits", insert --,--.
Column 27, line 64, after "said", insert --method--.
Column 28, line 11, "receiving" should read --received--.
Column 29, line 14, after "whereby", delete "by".
Column 29, line 25, "one" should read --ones--.
Column 30, line 2, after "said", insert --method--.
Column 30, line 17, "receiving" should read --received--.

This certificate supersedes the Certificate of Correction issued September 4, 2007.

Signed and Sealed this

Ninth Day of February, 2010

David J. Kappos
*Director of the United States Patent and Trademark Office*